(12) United States Patent
Kagawa et al.

(10) Patent No.: US 7,660,015 B2
(45) Date of Patent: Feb. 9, 2010

(54) COLOR DATA CONVERSION APPARATUS AND METHOD

(75) Inventors: Shuichi Kagawa, Tokyo (JP); Jun Someya, Tokyo (JP); Hiroaki Sugiura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 520 days.

(21) Appl. No.: 11/581,576

(22) Filed: Oct. 17, 2006

(65) Prior Publication Data

US 2007/0086030 A1      Apr. 19, 2007

(30) Foreign Application Priority Data

Oct. 18, 2005   (JP) ............................. 2005-302816

(51) Int. Cl.
| | |
|---|---|
| G03F 3/08 | (2006.01) |
| G06F 15/00 | (2006.01) |
| H04N 1/46 | (2006.01) |
| G06K 9/00 | (2006.01) |

(52) U.S. Cl. .................. 358/1.9; 358/518; 358/535; 382/162; 382/167; 382/205

(58) Field of Classification Search ............... 358/1.9, 358/518, 535; 382/162, 167, 205
See application file for complete search history.

(56) References Cited

U.S. PATENT DOCUMENTS 5,995,165 A * 11/1999 Oh .......................... 348/661
6,621,497 B1 * 9/2003 Sugiura et al. ............... 345/600
6,865,292 B1   3/2005 Kagawa et al.
7,215,366 B2 * 5/2007 Mori et al. ................ 348/223.1
2003/0228055 A1   12/2003 Kanagawa et al.
2004/0109604 A1   6/2004 Kagawa et al.

FOREIGN PATENT DOCUMENTS

| JP | 3432468 B2 | 5/2003 |
|---|---|---|
| JP | 2005-184117 A | 7/2005 |
| JP | 2005-210201 A | 8/2005 |
| JP | 2005-303989 A | 10/2005 |

* cited by examiner

*Primary Examiner*—Edward L Coles
*Assistant Examiner*—Charlotte M Baker
(74) *Attorney, Agent, or Firm*—Birch, Stewart, Kolasch & Birch, LLP

(57) ABSTRACT

A color conversion apparatus receives red-green-blue color data, calculates characteristic information and first hue region data from the color data, adjusts the first hue region data according to the characteristic information to obtain second to N-th hue region data, N being an integer equal to or greater than three, generates matrix coefficients for the second to N-th hue region data, and performs a matrix operation on the second to N-th hue region data to obtain color data with four or more color components. Color data with three primary components are thereby converted to color data with four or more primary components by simple calculations, without using a large amount of memory space.

13 Claims, 25 Drawing Sheets

| IDENTIFICATION CODE | MAXIMUN VALUE | MINIMUM VALUE | ZERO CHROMATIC COLOR COMPONENT DATA |
|---|---|---|---|
| 0 | R1 | G1 | g, c |
| 1 | R1 | B1 | b, c |
| 2 | G1 | R1 | r, m |
| 3 | G1 | B1 | b, m |
| 4 | B1 | R1 | r, y |
| 5 | B1 | G1 | g, y |

| IDENTIFICATION CODE | Q1 | Q2 | P1 | P2 |
|---|---|---|---|---|
| 0 | r | b | m | y |
| 1 | r | g | y | m |
| 2 | g | b | c | y |
| 3 | g | r | y | c |
| 4 | b | g | c | m |
| 5 | b | r | m | c |

FIG.7

| IDENTIFICATION CODE S1 | hlql | hlpl |
|---|---|---|
| 0 | hlm = min(b, r) | hlr = min(y, m) |
| 1 | hly = min(r, g) | hlr = min(y, m) |
| 2 | hlc = min(g, b) | hlg = min(c, y) |
| 3 | hly = min(r, g) | hlg = min(c, y) |
| 4 | hlc = min(g, b) | hlb = min(m, c) |
| 5 | hlm = min(b, r) | hlb = min(m, c) |

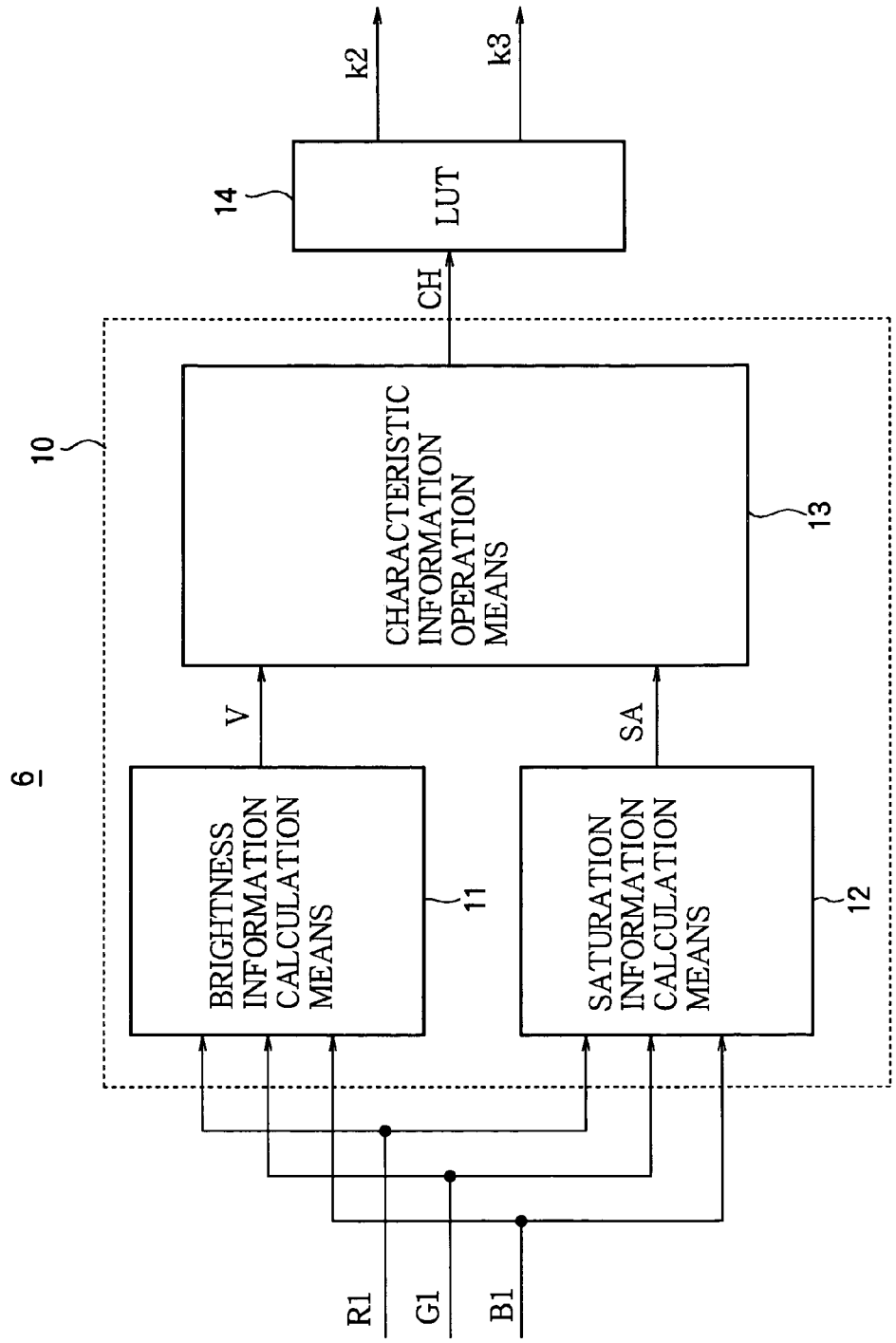

FIG.10
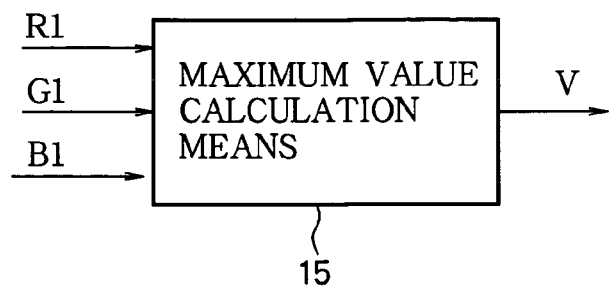
FIG.11
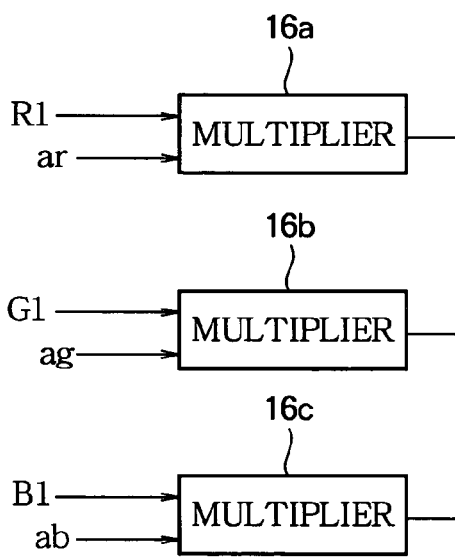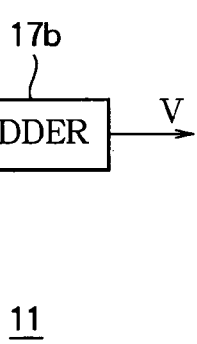

FIG. 31

| IDENTIFICATION CODE | h1q1 | h1p1 | h22 | h23 |
|---|---|---|---|---|
| 0 | h1m | h1r | k2*h2rm = k2*min(h1r, h1m) | k3*h2rm = k3*min(h1r, h1m) |
| 1 | h1y | h1r | k2*h2ry = k2*min(h1r, h1y) | k3*h2ry = k3*min(h1r, h1y) |
| 2 | h1c | h1g | k2*h2gc = k2*min(h1g, h1c) | k3*h2gc = k3*min(h1g, h1c) |
| 3 | h1y | h1g | k2*h2gy = k2*min(h1g, h1y) | k3*h2gy = k3*min(h1g, h1y) |
| 4 | h1c | h1b | k2*h2bc = k2*min(h1b, h1c) | k3*h2bc = k3*min(h1b, h1c) |
| 5 | h1m | h1b | k2*h2bm = k2*min(h1b, h1m) | k3*h2bm = k3*min(h1b, h1m) |

COLOR DATA CONVERSION APPARATUS AND METHOD

BACKGROUND OF THE INVENTION

1. Field of the Invention

The present invention relates to color data processing in full-color printing equipment and related equipment such as printers, video printers, and scanners, or in monitors and other display equipment. More particularly, the invention relates to a color data conversion apparatus and method for image output equipment that displays images by using four or more primary colors.

2. Description of the Related Art

Conventional color image display apparatus is generally trichromatic, operating with the three primary colors red, green, and blue. In an XYZ color coordinate system, the gamut of colors that can be displayed is represented by a triangle in the XY plane (referred to as an XY chromaticity diagram), the vertices of the triangle being the three primary colors. To enlarge the gamut of colors that can be displayed, the color coordinates of the vertices are preferably chosen so as to enlarge the area of the triangle. This can be done by attenuating unnecessary wavelength components of the primaries, so that their spectral curves are concentrated around a single wavelength, but in many types of display apparatus this leads to problems such as reduced brightness or increased power consumption. The shape of the spectrum locus on the XY chromaticity diagram also suggests that the trichromatic color expression is not necessarily efficient in increasing the gamut of displayable colors.

Recent research and development work is therefore shifting toward apparatus that uses four or more primary colors. The gamut of colors that can be reproduced by such apparatus is represented in the XY chromaticity diagram by a polygon with four or more vertices. Arbitrary colors within the polygon are generated from data with four or more values that control, for example, the emission brightness (in apparatus of the self-emitting type) or transmittance (in liquid crystal display apparatus) of the primary colors.

An essential requirement for such apparatus is a device or method for converting trichromatic image data to image data expressed in terms of the four or more primaries, not only to maintain compatibility with existing apparatus but also for reasons such as data size, and because most color image capture devices generate trichromatic color data.

Color conversion is already a known art. One known method, disclosed in Japanese Patent No. 3432468, operates on trichromatic image data to obtain chromatic component data for six colors (red, green, blue, cyan, magenta, and yellow), then performs further operations on the chromatic component data to obtain polynomial data with eighteen terms, selects valid (non-zero) terms, and performs a matrix operation on the valid terms and the three primary chromatic components to obtain trichromatic output data. This method can be implemented as a color conversion lookup table stored in a read-only memory (ROM).

In principle, a similar method could be used convert trichromatic image data to image data with four or more primary colors, by storing four or more output data values in the ROM for each combination of three input values. Besides requiring additional memory space, however, such a method would lack flexibility, and in any case the above disclosure does not explain how four or more output values should be derived. A particular problem is that with four or more primary colors, the same color can generally be expressed in many different ways, and it is not clear how to select one of those ways.

SUMMARY OF THE INVENTION

An object of the present invention is to convert color data with three color components to appropriate color data with four or more color components without using a large amount of memory space.

The invention provides color conversion apparatus for converting first image data to second image data. The first image data have first color data with three values (red, green, blue) per picture element (pixel). The second image data have second color data with at least four values per pixel. The color conversion apparatus includes:

means for calculating characteristic information of the first color data;

means for calculating a plurality of first hue region data values valid in respective hue regions surrounding certain predetermined hues;

means for using the characteristic information to adjust magnitudes of the plurality of the first hue region data values to obtain, for at least some of the hue regions, second to N-th hue region data values, N being an integer equal to or greater than three;

coefficient generating means for generating prescribed matrix coefficients for the second to N-th hue region data values; and matrix operation means for calculating the second color data by performing a matrix operation including multiplication of the second to N-th hue region data values by the matrix coefficients.

The above means enable color data with three primary color components to be converted to an appropriate combination of color data with four or more primary color components by simple calculations, without using a large amount of memory space.

BRIEF DESCRIPTION OF THE DRAWINGS

In the attached drawings:

FIG. 7 indicates the first hue region data output from the first hue region data calculation means 3 in FIG. 1 for each value of the identification code;

FIG. 9 is a block diagram illustrating an exemplary internal structure of the multiplier coefficient calculation means in FIG. 1;

FIG. 10 is a block diagram illustrating an exemplary internal structure of the brightness information calculation means in FIG. 9;

FIG. 11 is a block diagram illustrating another exemplary internal structure of the multiplier coefficient calculation means in FIG. 1;

FIG. 31 indicates the first hue region data output from the first hue region data calculation means and the inter-hue region data output from the inter-hue region data calculation means in FIG. 30 for each value of the identification code;

DETAILED DESCRIPTION OF THE INVENTION

Figure 1:
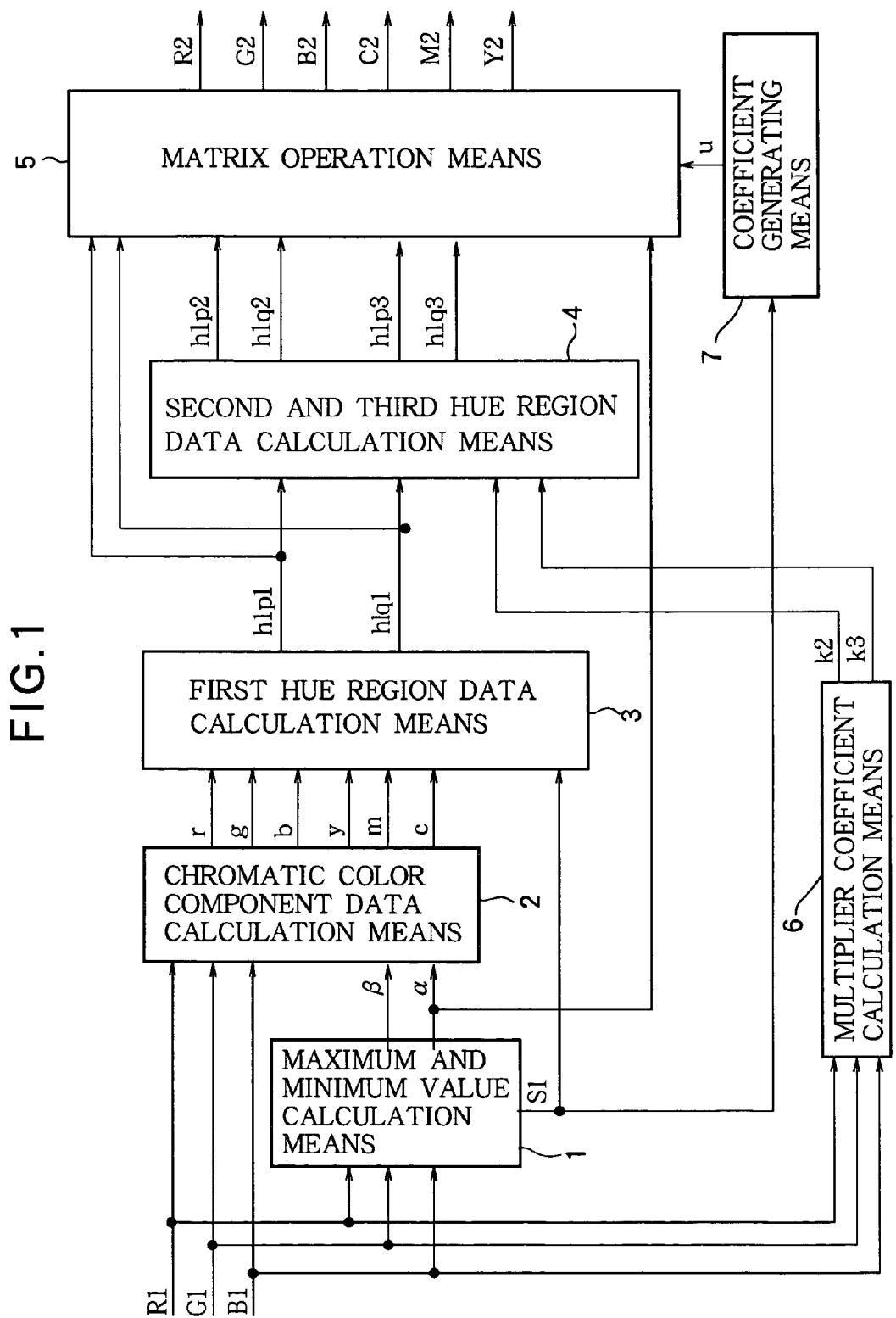
FIG. 1 is a block diagram illustrating a color data conversion apparatus according to a first embodiment of the invention.
Figure 2A:
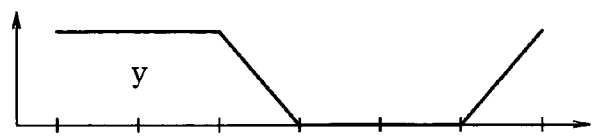
FIGS. 2A, 2B, 2C, 2D, 2E, and 2F schematically show relationships between hues and chromatic component data.
Figure 2B:
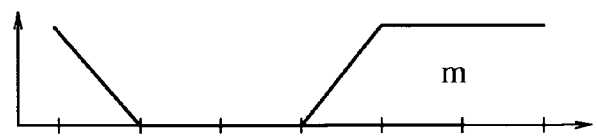
Figure 2C:
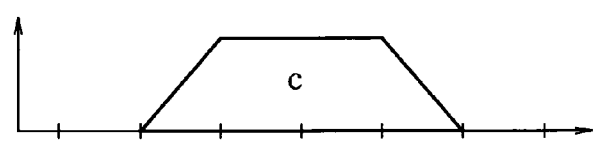
Figure 2D:
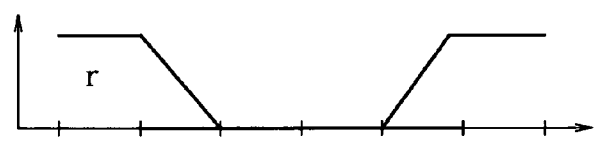
Figure 2E:
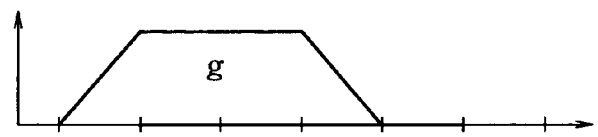
Figure 2F:
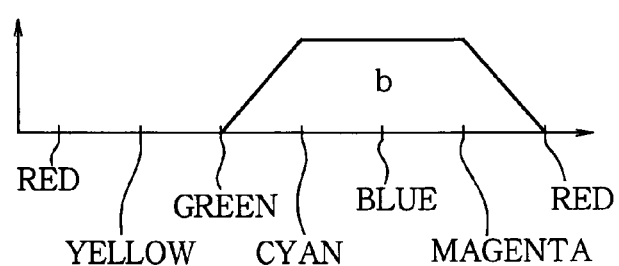

Embodiments of the invention will now be described with reference to the attached drawings, in which like elements are indicated by like reference characters.

The notation min(A, B) will be used to indicate the smaller of two arbitrary values A and B.

First Embodiment

Referring to FIG. 1, the color data conversion apparatus in the first embodiment comprises a maximum and minimum value calculation means 1, a chromatic color component data calculation means 2, a first hue region data calculation means 3, a second and third hue region data calculation means 4, a matrix operation means 5, a multiplier coefficient calculation means 6, and a coefficient generating means 7. In the drawing, R1, G1, and B1 indicate first color data for the three colors red, green, and blue. The first color data R1, G1, B1 are input to the maximum and minimum value calculation means 1, chromatic color component data calculation means 2, and multiplier coefficient calculation means 6.

The maximum and minimum value calculation means 1 selects and outputs the maximum value $\beta$ and minimum value $\alpha$ of the first color data R1, G1, B1 and generates an identification code S1 indicating the colors in which the maximum and minimum values occur. The output maximum value $\beta$ and minimum value $\alpha$ are input to the chromatic color component data calculation means 2. The minimum value $\alpha$ is also input to the matrix operation means 5. The minimum value $\alpha$ expresses the size of the achromatic (gray) component in the first color data R1, G1, B1. The identification code S1 is input to the first hue region data calculation means 3 and the coefficient generating means 7.

The chromatic color component data calculation means 2 calculates the chromatic component data r, g, b, y, m, and c representing the magnitudes of the red, green, blue, yellow, magenta, and cyan color (chromatic) components left after the achromatic component has been removed from the colors represented by the first color data, on the basis of the first color data R1, G2, B3 and the maximum value $\beta$ and minimum value $\alpha$ output from the maximum and minimum value calculation means 1. These chromatic data are obtained by subtraction ($r=R1-\alpha$, $g=G1-\alpha$, $b=B1-\alpha$, $y=\beta-B1$, $m=\beta-G1$, $c=\beta-R1$), and are related to the hue and saturation of the color data. A property of the chromatic component data obtained as above is that at least one of r, g, and b and at least one of y, m, and c assumes a value of zero.

If the maximum value $\beta$ is R1 and the minimum value $\alpha$ is G1 ($\beta=R1$, $\alpha=G1$), for example, from the above subtraction processes, g is zero and c is zero; if the maximum value $\beta$ is R1 and the minimum value $\alpha$ is B1 ($\beta=R1$, $\alpha=Bi$), then b is zero and c is zero. Depending on the maximum-minimum combination of R1, G1, B1, that is, a total of at least two values, including at least one of r, g, and b and at least one of y, m, and c assume a value of zero.

FIGS. 2a to 2f schematically show the relationships between the chromatic component data r, y, g, c, b, m and the six hues red, yellow, green, cyan, blue, and magenta. For any hue, at least one of the r, g, and b values is zero, and at least one of the y, c, and m values is zero. Each item of chromatic component data has non-zero values for three of the six hues. The six items of chromatic component data r, g, b, y, m, c output from the maximum and minimum value calculation means 1 are sent to the first hue region data calculation means 3.

Figures 3, 4:
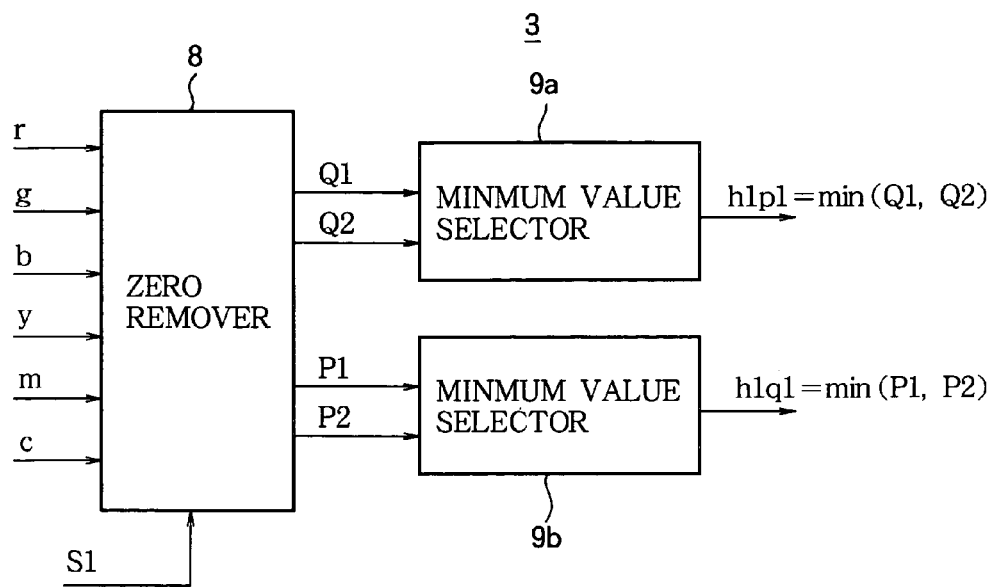
FIG. 3 is a block diagram showing an exemplary internal structure of the first hue region data calculation means in FIG. 1.
FIG. 4 shows relationships between first color data and chromatic component data identified by an identification code.

FIG. 3 is a block diagram showing an example of the internal structure of the hue region data calculation means 3. From the six items of input chromatic component data, the zero remover 8 removes data that become zero, as indicated by the identification code S1 received from the maximum and minimum value calculation means 1. The minimum value selectors 9a, 9b each receive two chromatic component data values from the zero remover 8 and select and output the smaller value of the two input values.

FIG. 4 is a table illustrating relationships among the identification code S1, the maximum value β and minimum value α of the first color data R1, G1, B1, and the chromatic color component data that assume a value of zero. When there are two or more maximum or minimum data, a plurality of candidates may be selected as the identification code S1 and, for example, the candidate having the smallest value may be selected. When R1=G1>B1, for example, R1 and G1 are the maximum data and B1 is the minimum data, so the identification code S1 could take the value '1' or '3'. In the following description, the smallest value is selected (S1=1).

The values of the identification code S1 in FIG. 4 are exemplary; identification code values may be assigned in other ways if so desired.

Figures 5, 6:
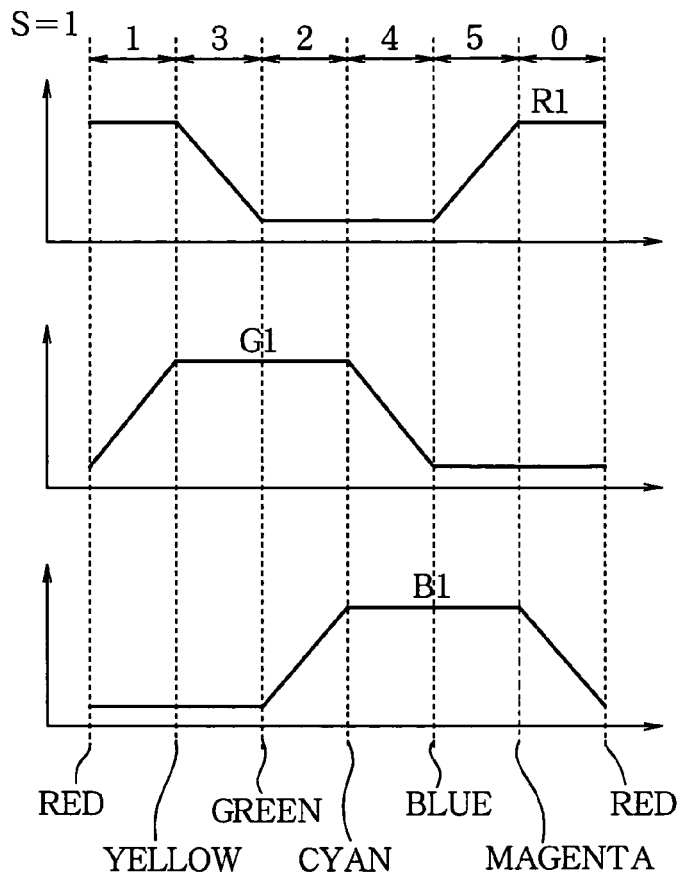
FIG. 5 illustrates relationships between the identification code and the first color data.
FIG. 6 indicates the data output from the zero remover in FIG. 3 for each value of the identification code.
Figure 8A:
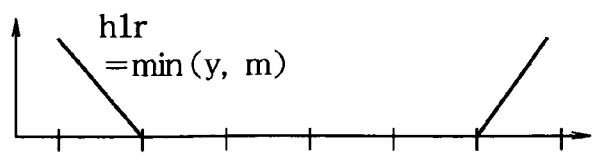
FIGS. 8A, 8B, 8C, 8D, 8E, and 8F schematically show relationships between the hues and the first hue region data.
Figure 8B:
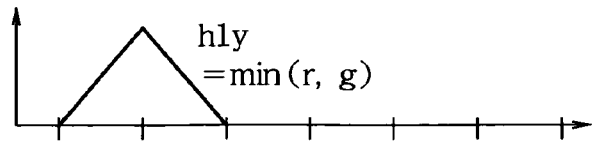
Figure 8C:
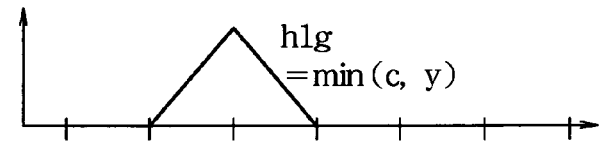
Figure 8D:
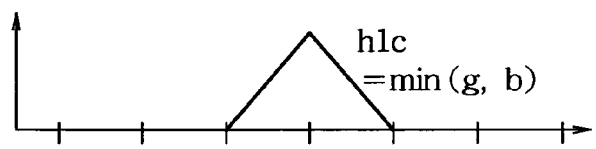
Figure 8E:
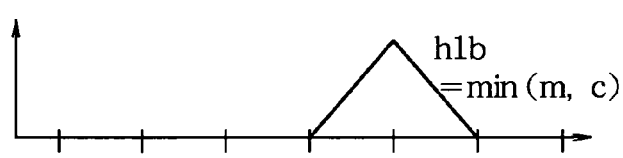
Figure 8F:
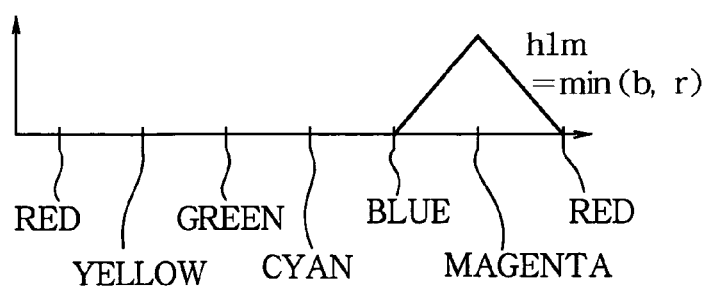

The identification code S1 also indicates hue information about the first color data R1, G1, B1. FIG. 5 schematically illustrates relationships between the values of the identification code S1 shown in FIG. 4 and the hues of the first color data. For example, when S1=1, the first color data indicate a color between red and yellow.

The first hue region data calculation means 3 receives the six hue data r, g, b, y, m, c output from the chromatic color component data calculation means 2 and the identification code S1 output from the maximum and minimum value calculation means 1, and selects two non-zero data Q1, Q2 from among the data r, g, b and two non-zero data P1, P2 from among the data y, m, c on which to perform calculations. This operation will be described with reference to FIG. 3. In the first hue region data calculation means 3, the chromatic component data r, g, b, y, m, c and identification code S1 are input to the zero remover 8. Depending on the identification code S1, the zero remover 8 outputs two non-zero data Q1, Q2 selected from among the data r, g, b and two non-zero data P1, P2 selected from among the data y, m, c. Incidentally, despite the use of the term 'non-zero', when two or more of the chromatic component data r, g, b have a value of zero, one or both of the Q1 and Q2 data has a value of zero, and when two or more of the chromatic component data y, m, c have a value of zero, one or both of the P1 and P2 data have a value of zero.

The data Q1, Q2, P1, P2 are determined and output, for example, as shown in FIG. 6.

When the identification code S1 has a value of zero(S1=0), r and b are selected as Q1 and Q2 and output as Q1=r and Q2=b, and m and y are selected as P1 and P2 and output as P1=m and P2=y.

As in FIG. 4 above, the values of the identification code S1 in FIG. 6 are exemplary; other values may be used if desired.

The minimum value selector 9a selects the smaller of the data Q1 and Q2 output from the zero remover 8 and outputs it as the minimum value $h1q1=\min(Q1, Q2)$; the minimum value selector 9b selects the smaller of the data P1 and P2 output from the zero remover 8 and outputs it as the minimum value $h1p1=\min(P1, P2)$. The values $h1q1$, $h1p1$ output from the minimum value selectors 9a, 9b are sent from the first hue region data calculation means 3 to the second and third hue region data calculation means 4 as first hue region data.

The value of $h1q1$ is one of $h1y=\min(r, g)$, $h1m=\min(b, r)$, and $h1c=\min(g, b)$, and the value of $h1p1$ is one of $h1r=\min(y, m)$, $h1g=\min(c, y)$, and $h1b=\min(m, c)$. Whether $h1q1$ becomes $h1y$, $h1g$, or $h1b$ and whether $h1p1$ become $h1r$, $h1g$, or $h1b$ depends on the identification code S1, which may vary from pixel to pixel. FIG. 7 illustrates relationships between the identification code S1 and the first hue region data $h1q1$, $h1p1$.

Each item of first hue region data $h1r$, $h1g$, $h1b$, $h1c$, $h1m$, $h1y$ obtained by selecting minimum values from pairs of chromatic component data has a non-zero value at only one of the six hues red, green, blue, cyan, magenta, and yellow. That is, only one first hue region data value is valid for each of the six primary hues.

FIGS. 8A to 8F show how each item of first hue region data $h1r$, $h1g$, $h1b$, $h1c$, $h1m$, $h1y$ is related to a single one of the six hues. For the red hue, for example, r=W, g=b=0, y=m=W, and c=0, where W is a constant value. Accordingly, $h1r=\min(y, m)=W$, and the remaining five items of first hue region data $h1g$, $h1b$, $h1y$, $h1m$, $h1c$ are all zero. This means that $h1r=\min(y, m)$ is the only valid first hue region data for the red hue. Similarly, $h1g=\min(c, y)$, $h1b=\min(m, c)$, $h1c=\min(g, b)$, $h1m=\min(b, r)$, and $h1y=\min(r, g)$ are the only valid first hue region data for green, blue, cyan, magenta, and yellow, respectively.

The first hue region data $h1r$, $h1g$, $h1b$, $h1c$, $h1m$, $h1y$ are thus valid (non-zero) in ranges surrounding predetermined hues, and the valid items of first hue region data at each pixel are selectively output as $h1q1$ and $h1p1$. When the number of valid (non-zero) items is one or less at a particular pixel, however, one or both of $h1q1$ and $h1p1$ has a value of zero.

The multiplier coefficient calculation means 6 receives the first color data R1, G1, B1 as shown in FIG. 1. FIG. 9 is a block diagram illustrating an exemplary internal structure of the multiplier coefficient calculation means 6, including a characteristic information calculation means 10, a brightness information calculation means 11, a saturation information calculation means 12, a characteristic information operation means 13, and a lookup table (LUT) 14. The characteristic information calculation means 10 receives the first color data R1, G1, B1, calculates characteristic information CH thereof, and outputs the characteristic information CH to the lookup table 14.

The characteristic information calculation means 10 comprises the brightness information calculation means 11, saturation information calculation means 12, and characteristic information operation means 13. The first color data R1, G1, B1 input to the characteristic information calculation means 10 are supplied to the brightness information calculation means 11 and saturation information calculation means 12. The brightness information calculation means 11 calculates and outputs brightness information V expressing the brightness value of the color represented by the R1, G1, and B1 data. The saturation information calculation means 12 calculates and outputs saturation information SA expressing what is sometimes called the colorfulness or vibrancy of the color represented by the R1, G1, and B1 data. The characteristic information operation means 13 calculates the characteristic information CH by, for example, the following equation (1).

$$CH=(V+SA)/2 \quad (1)$$

The characteristic information CH obtained by the above equation (1) includes both brightness information V and saturation information SA. The division by two in equation (1) is performed for convenience to adjust the magnitude of the value of the characteristic information CH, but is not essential.

The lookup table 14 is configured as, for example, a memory storing multiplier coefficients k2, k3 corresponding to each value of the characteristic information CH, which is used as an address. The lookup table 14 thus receives the characteristic information CH as a read address and outputs the corresponding multiplier coefficients.

FIG. 10 is a block diagram illustrating an exemplary internal structure of the brightness information calculation means 11. Referring to FIG. 10, the brightness information calculation means 11 comprises a maximum value calculation means 15. The maximum value calculation means 15 receives the first color data R1, G1, B1 and outputs the maximum (MAX1) of the three values as the brightness information V.

FIG. 11 is a block diagram illustrating another exemplary internal structure of the brightness information calculation means 11. The brightness information calculation means 11 in FIG. 11 comprises three multipliers 16a, 16b, 16c and two adders 17a, 17b. The multipliers 16a, 16b, 16c multiply the first color data R1, G1, B1 by respective weighting coefficients ar, ag, ab and output the multiplication results. The adder 17a receives the outputs from multipliers 16b, 16c and outputs their sum. The adder 17b receives the outputs from multiplier 16a and adder 17a, and outputs their sum as the brightness information V. Accordingly, if the brightness information calculation means 11 has the structure shown in FIG. 11, it outputs the brightness information V given by the following equation (2).

$$V = ar \times R1 + ag \times G1 + ab \times B1 \quad (2)$$

When the first color data R1, G1, B1 conform to the NTSC standard, for example, the coefficients in the above equation (2) may be set to ar=0.3, ag=0.59, and ab=0.11. Alternatively, the coefficients may be set to ar=0.25, ag=0.5, and ab=0.25, in which case the multipliers 16a, 16b, 16c can be implemented by bit shifting, so that the circuit size can be reduced.

When the brightness information calculation means 11 has the structure shown in FIG. 11, in which the first color data R1, G1, B1 are multiplied by respective coefficients and then added together, it is possible to calculate brightness information V that approximates the human sense of brightness. In the color data conversion apparatus of the present embodiment, however, the brightness information calculation means 11 is assumed to have the structure shown in FIG. 10, in which the maximum value of the first color data R1, G1, B1 is output as the brightness information V.

Figure 12:
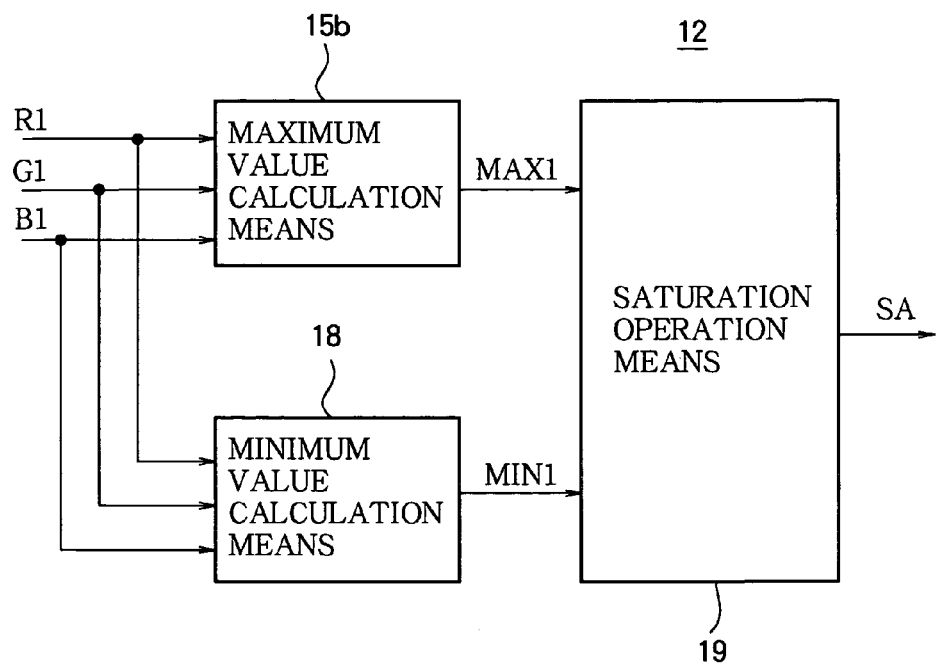
FIG. 12 is a block diagram illustrating an exemplary internal structure of the saturation information calculation means in FIG. 9.

FIG. 12 is a block diagram illustrating an exemplary structure of the saturation information calculation means 12. The saturation information calculation means 12 in FIG. 12 comprises a maximum value calculation means 15b, a minimum value calculation means 18, and a saturation operation means 19. The first color data R1, G1, B1 are input to the maximum value calculation means 15b and minimum value calculation means 18. The maximum value calculation means 15b calculates and outputs the maximum value MAX1 of the first color data R1, G1, B1. The minimum value calculation means 18 calculates and outputs the minimum value MIN1 of the first color data R1, G1, B1. The saturation operation means 19 receives the above maximum value MAX1 and minimum value MIN1 and calculates the saturation information SA by, for example, the following equation (3).

$$SA = (MAX1 - MIN1)/(MAX1) \quad (3)$$

According to the above equation (3), when the first color data are R1=255, G1=0, and B1=0, the saturation information is calculated as SA=1.0; when the first color data are R1=128, G1=64, and B1=64, the saturation information is calculated as SA=0.5.

The saturation information calculated from the above equation (3) is independent of the brightness of the color. It is necessary, however, to perform a division operation, which leads to an increase of the circuit scale in a hardware implementation and to an increase of processing time in a software implementation. To avoid the increase of the circuit scale or processing time, the saturation information SA can also be calculated by the following equation (4) instead of the above equation (3).

$$SA = (MAX1 - MIN1) \quad (4)$$

According to the above equation (4), when the first color data are R1=255, G1=0, and B1=0, the saturation information is calculated as SA=255; when the first color data are R1=128, G1=64, and B1=64, the saturation information is calculated as SA=64. The saturation information calculation means 12 in the present embodiment is assumed to calculate the saturation information SA by using equation (4). The characteristic information CH calculated by the characteristic information calculation means 10 is accordingly equal to MAX1−MIN1/2.

The lookup table 14 prestores predetermined second and third multiplier coefficients k2, k3 corresponding to each value of the characteristic information CH. When the lookup table 14 receives a value of the characteristic information CH, it outputs the corresponding second and third multiplier coefficients k2, k3.

The second and third multiplier coefficients k2, k3 output from the multiplier coefficient calculation means 6 are input to the second and third hue region data calculation means 4 together with the first hue region data h1p1, h1q1.

Figure 13:
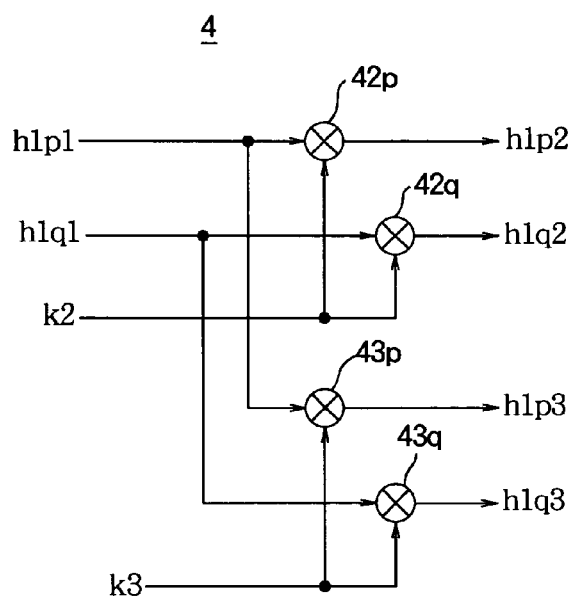
FIG. 13 is a block diagram illustrating an exemplary internal structure of the second and third hue region data calculation means in FIG. 1.

FIG. 13 is a block diagram illustrating an exemplary internal structure of the second and third hue region data calculation means 4. The second and third hue region data calculation means 4 in FIG. 13 comprises multipliers 42p, 42q, 43p, 43q. Multipliers 42p, 42q multiply the first hue region data h1p1, h1q1 by the second multiplier coefficient k2 to obtain second hue region data h1p2, h1q2. Multipliers 43p, 43q multiply the first hue region data h1p1, h1q1 by the third multiplier coefficient k3 to obtain third hue region data h1p3, h1q3.

In the second hue region data, h1q2 is one of h1y2 (=k2*h1y), h1m2 (=k2*h1m), and h1c2 (=k2*h1c), and h1p2 is one of h1r2 (=k2*h1r), h1g2 (=k2*h1g), and h1b2 (=k2*h1b), where the asterisks indicate multiplication. Each of h1r2, h1g2, h1b2, h1c2, h1m2, and h1y2 is also valid for a corresponding one of the six hues.

In the third hue region data, h1q3 is one of h1y3 (=k3*h1y), h1m3 (=k3*h1m), and h1c3 (=k3*h1c), and h1p3 is one of h1r3 (=k3*h1r), h1g3 (=k3*h1g), and h1b3 (=k3*h1b). Each of h1r3, h1g3, h1b3, h1c3, h1m3, and h1y3 is also valid for a corresponding one of the six hues.

If the second and third multiplier coefficients k2, k3 are predetermined in such a way that their sum is unity, (so that k3=1−k2), the third hue region data can also be calculated by subtracting the second hue region data from the first hue region data as follows:

$$h1p3 = h1p1 - h1p2$$

$$h1q3 = h1q1 - h1q2$$

In this case, the second and third hue region data values are obtained by dividing each first hue region data value into two parts in a ratio determined by the value of the characteristic information CH.

The coefficient generating means 7 stores a complete set of matrix coefficients for the second and third hue region data for all six hues: red, yellow, green, cyan, blue, and magenta. That is, the coefficient generating means 7 stores matrix coefficients for h1r2, h1g2, h1b2, h1y2, h1m2, and h1c2, and h1r3, h1g3, h1b3, h1y3, h1m3, and h1c3. From these, according to the value of the identification code S1, the coefficient generating means 7 selects matrix coefficients U(Fij) applicable to hue region data valid for the relevant pixel and outputs them to the matrix operation means 5. (The letters i and j denote rows and columns in the matrix.) When S1=0, for example, since h1$q$2=h1$m$2, h1$p$2=h1$r$2, h1$q$3=h1$m$3, and h1$p$3=h1$r$3, the coefficient generating means 7 outputs the matrix coefficients for h1$m$2, h1$r$2, h1$m$3, and h1$r$3. The coefficient generating means 7 also outputs matrix coefficients for the minimum value α.

Figure 14:
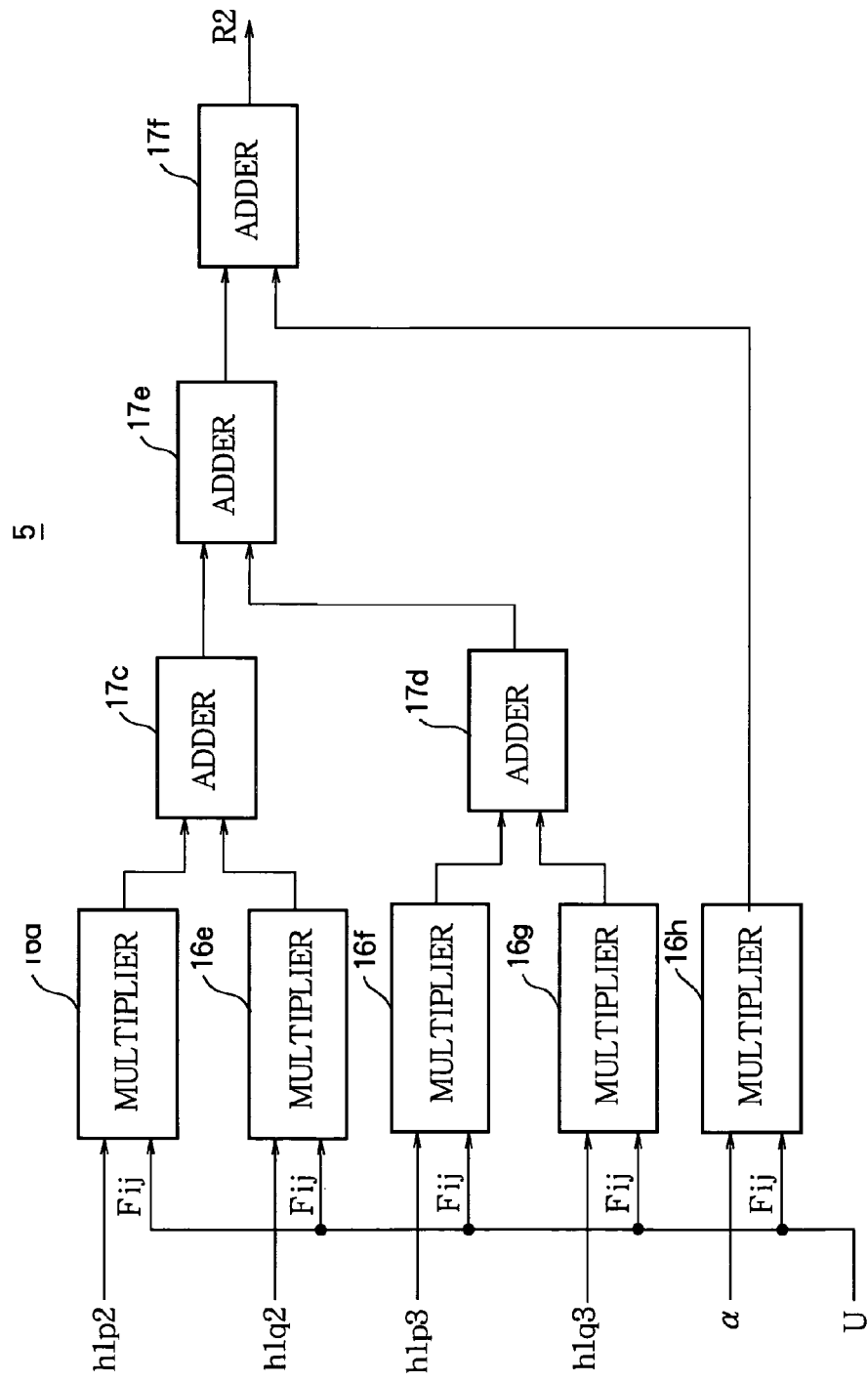
FIG. 14 is a block diagram illustrating an exemplary internal structure of the matrix operation means in FIG. 1.

FIG. 14 is a block diagram illustrating an exemplary partial internal structure of the matrix operation means 5, showing the structure for calculating the second color data R2. Respective two-input multipliers 16$d$ to 16$h$ receive the second hue region data h1$p$2, h1$q$2, the third hue region data h1$p$3, h1$q$3, and the minimum value α of the first color data at one input and a coefficient U(Fij) output from the coefficient generating means 7 at their other input, and output the product of the two inputs.

An adder 17$c$ receives the products output from these multipliers 16$d$, 16$e$ as inputs, and outputs the sum of the input data values. An adder 17$d$ receives the products output from multipliers 16$f$, 16$g$ as inputs, and outputs the sum of the input data values. An adder 17$e$ adds the data values output from the adders 17$c$, 17$d$, and outputs their sum. An adder 17$f$ adds the data values output from multiplier 16$h$ and adder 17$e$, and outputs their sum as the second color data R2.

The remaining second color data G2, B2, C2, M2, Y2 can be calculated by using a structure similar to the one shown in FIG. 14. The six calculated items of second color data R2, G2, B2, C2, M2, Y2 constitute the second image data.

The structure shown in FIG. 14 can be shared to calculate the second color data R2, G2, B2, C2, M2, Y2 by a time sharing scheme, by supplying the multipliers 16$a$ to 16$h$ with different coefficients Fij for different items of second color data R2, G2, B2, C2, M2, Y2, but if six of the structures shown in FIG. 14 are connected in parallel, the matrix operation can be carried out at higher speed.

In either case, in the color data conversion apparatus of the present embodiment, the second color data R2, G2, B2, C2, M2, Y2 are obtained from the following equation (5), where (Fij) indicates the matrix of coefficients, which has six rows (i=1 to 6) and five columns (j=1 to 5).

$$\begin{bmatrix} R2 \\ G2 \\ B2 \\ C2 \\ M2 \\ Y2 \end{bmatrix} = (Fij) \begin{bmatrix} h1p2 \\ h1q2 \\ h1p3 \\ h1q3 \\ \alpha \end{bmatrix} \quad (5)$$

The above equation (5) uses different matrix coefficients for different pixels. A general formula valid for all pixels is given by the following equation (6), by which the matrix operation is performed to obtain the second color data R2, G2, B2, C2, M2, Y2. In equation (6), Eij is a matrix of coefficients with six rows (i=1 to 6) and thirteen columns (j=1 to 13).

$$\begin{bmatrix} R2 \\ G2 \\ B2 \\ C2 \\ M2 \\ Y2 \end{bmatrix} = (Eij)\begin{bmatrix} h1r2 \\ h1g2 \\ h1b2 \\ h1c2 \\ h1m2 \\ h1y2 \\ h1r3 \\ h1g3 \\ h1b3 \\ h1c3 \\ h1m3 \\ h1y3 \\ \alpha \end{bmatrix} = (Eij)\begin{bmatrix} k2*h1r \\ k2*h1g \\ k2*h1b \\ k2*h1c \\ k2*h1m \\ k2*h1y \\ k3*h1r \\ k3*h1g \\ k3*h1b \\ k3*h1c \\ k3*h1m \\ k3*h1y \\ \alpha \end{bmatrix} \quad (6)$$

The reason for the difference in the number of terms in equation (5) and equation (6) is that, whereas equation (5) provides a calculation method for each pixel in which the data of terms known to be zero have been removed, equation (6) provides a general equation for all pixels. By removing values known to be zero, the hue region data for any single pixel can be reduced from six values to two values, described herein as 'valid' values. This reduction is achieved by taking advantage of the properties of the hue data.

The combination of valid data values generally varies depending on the pixel of interest, with all items of hue region data becoming valid at various pixels in the image.

The color data conversion circuit of the invention generates hue region data valid for particular hue regions, and performs a matrix operation including the multiplication of the hue region data values by matrix coefficients to obtain the second color data. The matrix coefficients by which each item of hue region data is multiplied apply only to hues in the hue region for which the item of hue region data is valid. Accordingly, the way in which a hue of particular interest is reproduced can be adjusted by adjusting the relevant matrix coefficients, without changing the reproduction of hues in other hue regions. Incidentally, the term 'hue region data' is used as a generic term for the first, second, and third hue region data.

Figure 15:
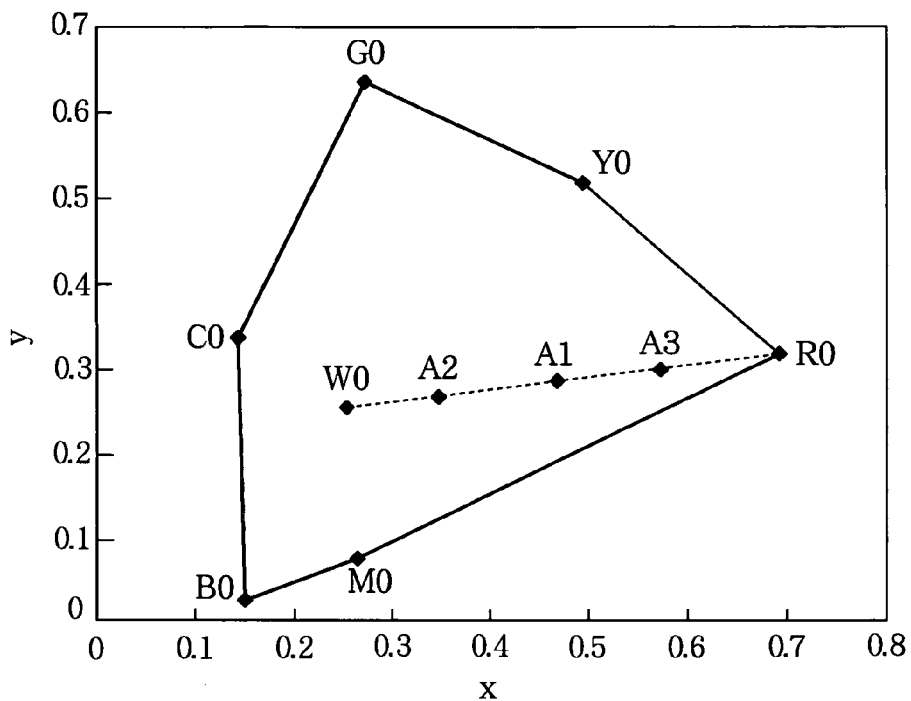
FIG. 15 is an XY chromaticity diagram showing examples of colors expressed by the second color data.

The effects of the color data conversion apparatus in the present embodiment will now be described. When an image is displayed with the three primary colors red, green, and blue, the ratio or balance of the three color data values that produce a particular chromaticity (x0, y0) is uniquely determined. When four or more primary colors are used, however, the ratio or balance of the color data values that produce a particular chromaticity (x0, y0) is usually not uniquely determined. The color data conversion apparatus in the present embodiment uses six primary colors. FIG. 15 is an XY chromaticity diagram showing examples of colors expressed by the second color data R2, G2, B2, C2, M2, Y2 corresponding to the six primary colors. In FIG. 15, R0, G0, B0, C0, M0, and Y0 indicate the chromaticities of the six primary colors on which the second color data R2, G2, B2, C2, M2, Y2 are based. In FIG. 15, the interior of the hexagon with vertices R0, Y0, G0, C0, B0, M0 corresponds to the gamut of colors expressible by these six primary colors.

Position W0 indicates the chromaticity of white. It is assumed here that each item of the second color data R2, G2, B2, C2, M2, Y2 has an 8-bit integer value (0 to 255) and white is the color produced when all six data items have the maximum value (R2=G2=B2=C2=M2=Y2=255). In FIG. 15, a color with a chromaticity at a position A1 located on the line connecting the position W0 indicating white and the position R0 indicating the red primary color can be produced by mixing white (W0) and the primary color red (R0). Alternatively, colors with this chromaticity (A1) can be produced by other combinations of the primaries: for example, since A1 is inside the triangle having the three primary colors red, yellow, and magenta (R0, Y0, M0) as vertices, a color with chromaticity A1 can be produced by mixing R0, Y0, and M0.

When a color with chromaticity A1 is produced by mixing white (W0) and red (R0), the second color data are given by the following equation (7), where the parameters a1, a2, and their sum (a1+a2) have values in the range from 0 to 255.

$$R2=a1+a2$$

$$G2=B2=C2=M2=Y2=a2 \quad (7)$$

When a color with chromaticity A1 is produced by mixing the three primary colors R0, Y0, M0, the second color data are given by the following equation (8), where the parameters a3, a4, and a5 have values in the range from 0 to 255.

$$R2=a3$$

$$G2=B2=C2=0$$

$$M2=a4$$

$$Y2=a5 \quad (8)$$

Different combinations of second color data can thus produce colors with the same chromaticity, but the resulting colors have different maximum brightnesses depending on the combination of data used.

Next, colors with chromaticities A2 and A3 in FIG. 15 will be considered. Positions A2 and A3 are located on the line connecting white (W0) and the primary color red (R0), so corresponding colors can be produced by mixing white (W0) and red (R0). Alternatively, a color with chromaticity A2 can be produced by mixing white (W0) and a color with chromaticity A1; similarly, a color with chromaticity A3 can be produced by mixing a color with chromaticity A1 and the primary color red (R0).

That is, colors having chromaticities on the line connecting the positions indicating white (W0) and the red primary color (R0) can all be produced by mixing white (W0) and the red primary color (R0). In this case, the second color data are given by the above equation (7), where the parameters a1, a2, a1+a2 have values in the range from 0 to 255, varying depending on the brightness and chromaticity of the color to be produced. Colors having chromaticities on the line connecting the positions indicating white (W0) and the color with chromaticity A1 can also be produced by mixing white (W0) and a color with chromaticity A1, which can be produced by mixing the three primary colors red, yellow, and magenta (R0, Y0, M0) as described above. In this case, the second color data are given by the following equation (9), where the values a6+a7, a7, a8+a7, and a9+a7 vary in the range from 0 to 255, depending on the brightness and chromaticity of the color to be produced.

$$R2=a6+a7$$

$$G2=B2=C2=a7$$

$$M2=a8+a7$$

$$Y2=a9+a7 \quad (9)$$

The colors having chromaticities on the line connecting the positions indicating chromaticity A1 and the red primary color (R0) can be produced by mixing the red primary color (R0) and a color with chromaticity A1, which can be produced by mixing the three primary colors red, yellow, and magenta (R0, Y0, M0) as described above. In this case, the second color data are given by the following equation (10), where the values a10+a11, a12, and a13 vary in the range from 0 to 255, depending on the brightness and chromaticity of the color to be produced.

$$R2=a10+a11$$

$$G2=B2=C2=0$$

$$M2=a12$$

$$Y2=a13 \quad (10)$$

As described above, different combinations of primary color data can produce the same chromaticity, but the resulting chromaticity has different maximum brightness values depending on the combination of primaries used. The color data conversion apparatus of the present embodiment calculates characteristic information CH from the brightness and saturation information of the first color data, calculates second and third hue region data by scaling the first hue region data values according to the value of the characteristic information CH, and calculates the second color data by performing a matrix operation on the second and third hue region data. The multiplier coefficients k2, k3 that scale the first hue region data to produce the second and third hue region data can be set to give priority to the second hue region data for comparatively small CH values and priority to the third hue region data for comparatively large CH values, for example. For colors with small characteristic values CH, the matrix operation then reflects mainly the effect of the matrix coefficients applied to the second hue region data, while for colors with large characteristic values CH, the matrix operation reflects mainly the effect of the matrix coefficients applied to the third hue region data. The matrix coefficients can accordingly be set to express colors with the same hue but different brightness and saturation characteristics by using different combinations and balances of the six primary colors represented by the second color data.

As described above, when four or more primary colors are used, the same chromaticity can be produced by different combinations of primary color data and the maximum possible brightness of a color with a given chromaticity depends on the combination of primary color data used to produce it. The color data conversion apparatus in the present embodiment can select and use an appropriate combination and balance of second color data, according to the value of the characteristic information CH, enabling accurate color data conversion to be carried out.

As an example, a combination that makes the maximum possible brightness as large as possible can be selected for low-saturation colors indicated by the first color data, and a combination that makes the maximum possible saturation as large as possible can be selected for high-saturation colors. As another example, a combination that makes the maximum possible saturation as large as possible can be selected for low-brightness colors, and a combination that makes the maximum possible brightness as large as possible can be selected for a high-brightness colors.

Figure 16:
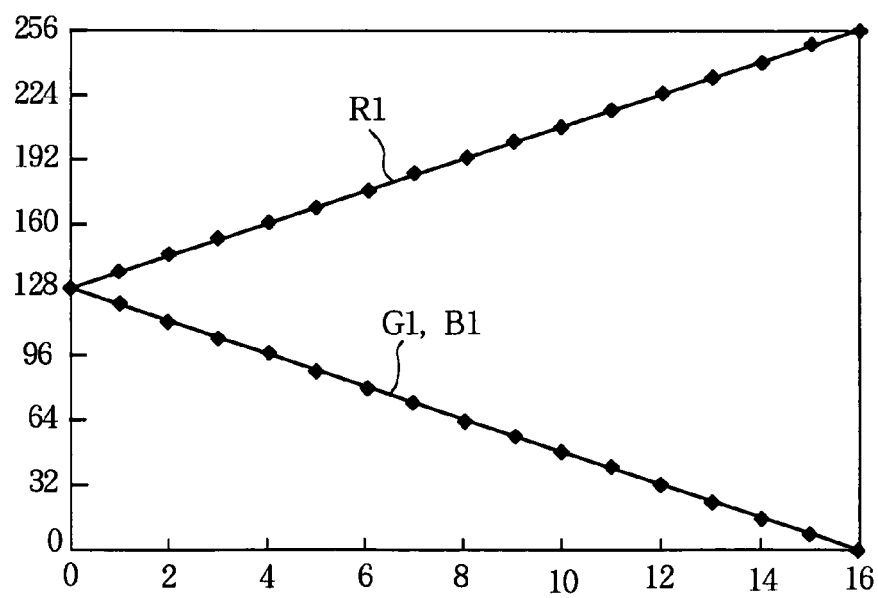
FIG. 16 shows exemplary first color data.

Specific numerical examples will be given below, assuming that each item of first color data R1, G1, B1 and second color data R2, G2, B2, C2, M2, Y2 is 8-bit binary data equivalent to decimal 0 to 255. In FIG. 16, an exemplary indexed set of first color data R1, G1, B1 is shown, where the horizontal axis indicates the data index number and the vertical axis indicates the color data value. FIG. 16 shows data that change from R1=128, G1=128, B1=128, expressing an intermediate shade of gray, to R1=255, G1=0, B1=0, expressing pure red. These colors have chromaticities lying on the line from W0 to R0 in FIG. 15.

Figure 17:
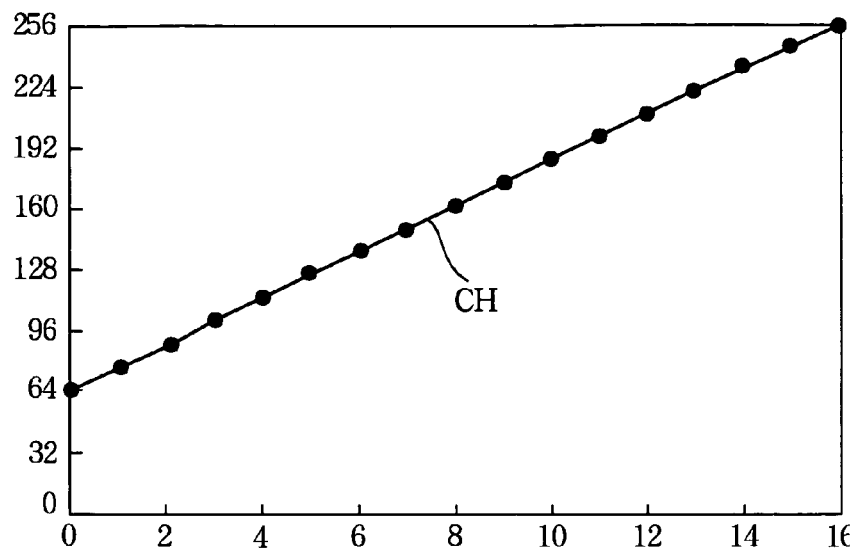
FIG. 17 shows exemplary characteristic information.

In the color data conversion apparatus of the present embodiment, the characteristic information CH is given by half the sum of the brightness information V and saturation information SA, the brightness information V being defined as the maximum value of the first color data, the saturation information SA being defined as the difference between the maximum and minimum values of the color data. Therefore, the characteristic information CH for the first color data shown in FIG. 16 has the values shown in FIG. 17, where the horizontal axis indicates the data index number and the vertical axis indicates the characteristic information value.

Figure 18:
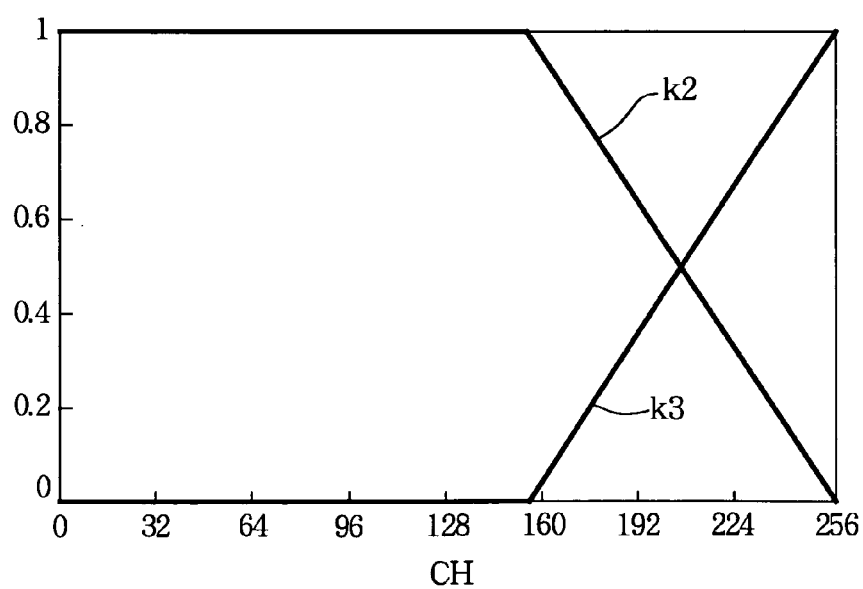
FIG. 18 shows exemplary multiplier coefficients.

FIG. 18 shows exemplary multiplier coefficients k2, k3 as functions of the characteristic information CH. In FIG. 18, the horizontal axis indicates the value of the characteristic information CH, and the vertical axis indicates the values of the multiplier coefficients. The multiplier coefficients shown in FIG. 18 are k2=1 and k3=0 when the value of the characteristic information CH is 153 or less. As the value of the characteristic information CH increases beyond 153, multiplier coefficient k2 decreases and multiplier coefficient k3 increases, reaching k2=0 and k3=1 at CH=255. Therefore, for comparatively small values of CH, the third hue region data are nullified and only the second hue region data are used; for larger values of CH, the effect of the second hue region data gradually decreases and the effect of the third hue region data gradually decreases until finally, at the maximum characteristic value CH, the second hue region data disappear and only the third hue region data are used. Since the multiplier coefficients k2, k3 add up to unity (k2+k3=1), the sum of the second and third hue region data is equal to the first hue region data.

Figure 19:
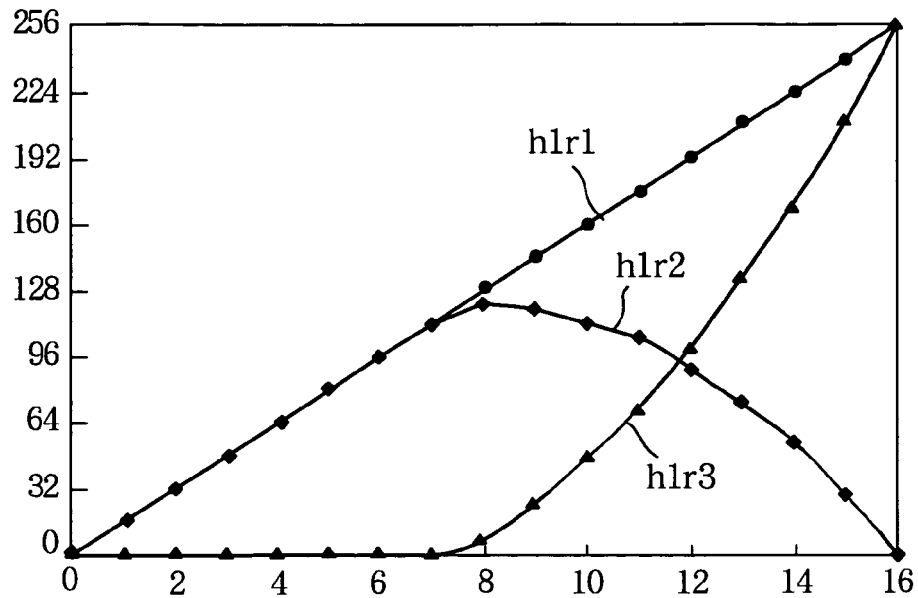
FIG. 19 shows exemplary first, second, and third hue region data.

FIG. 19 shows the values of the hue region data h1r, h1r2, h1r3 valid for red in the first, second, and third hue region data obtained for the first color data shown in FIG. 16. In FIG. 19, the horizontal axis indicates the data index number and the vertical axis indicates the values of the hue region data characteristic information. In the region where the characteristic information CH has a comparatively low value or a medium value (data index numbers zero to eleven), the second hue region data outweigh the third hue region data; in the region where the characteristic information CH has a comparatively high value, the third hue region data outweigh the second hue region data.

An example of the matrix coefficients (Eij) in the above equation (6) is shown in equation (11) below. The first to sixth columns in the matrix give coefficients for the second hue region data, the seventh to twelfth columns give coefficients for the third hue region data, and the thirteenth column gives coefficient for the minimum value α, which is the achromatic component.

$$(Eij) = \begin{bmatrix} 1 & -0.5 & -0.5 & -0.2 & 1 & 1 & 1 & 0 & 0 & 0 & 0 & 0 & 1 \\ -0.5 & 1 & -0.5 & 1 & -0.2 & 1 & 0 & 1 & 0 & 0 & 0 & 0 & 1 \\ -0.5 & -0.5 & 1 & 1 & 1 & -0.2 & 0 & 0 & 1 & 0 & 0 & 0 & 1 \\ -0.5 & 1 & 1 & 1 & -0.2 & -0.2 & 0 & 0 & 0 & 1 & 0 & 0 & 1 \\ 1 & -0.5 & 1 & -0.2 & 1 & -0.2 & 0 & 0 & 0 & 0 & 1 & 0 & 1 \\ 1 & 1 & -0.5 & -0.2 & -0.2 & 1 & 0 & 0 & 0 & 0 & 0 & 1 & 1 \end{bmatrix} \quad (11)$$

For red hues on the dotted line in FIG. 15, for which the only valid (non-zero) second and third hue region data are h1r2 and h1r3, the relevant columns in this matrix are the first column, which gives the coefficients applied to h1r2, the seventh column, which gives the coefficients applied to h1r3, and the thirteenth column, which gives coefficients applied to the achromatic component α. In the first column, the coefficients for obtaining second color data R2, M2, and Y2 have a value of one. Consequently, when the value of the characteristic information CH of the first color data is small, the chromatic component of shades of red is reproduced by using the second color data R2, M2, Y2. This corresponds to producing, in FIG. 15, a (low saturation) color with chromaticity A2 by mixing white (W0, the achromatic color) and the color with chromaticity A1, which is produced by mixing the red, magenta, and yellow primary colors (R0, M0, Y0). The coefficients for obtaining second color data G2, B2, and C2 have values of −0.5. These coefficients are used for adjusting the value of the achromatic component when the value of the characteristic information CH of the first color data is comparatively small.

In the seventh column, which gives coefficients for third hue region data h1r3, the coefficient for obtaining second color data R2 has a value of one and the remaining coefficients have values of zero. This implies that when the value of the characteristic information CH of the first color data becomes large, shades of red are reproduced mainly by using second color data R2. This corresponds to producing, in FIG. 15, a (bright, highly saturated) color with chromaticity A3 by mixing the red primary color (R0) and the color with chromaticity A1, which is produced by mixing the primary red, magenta, and yellow primary colors (R0, M0, Y0). Similar descriptions could be given for the coefficients in the other columns, which apply to second and third hue region data valid for hues other than red.

Figure 20:
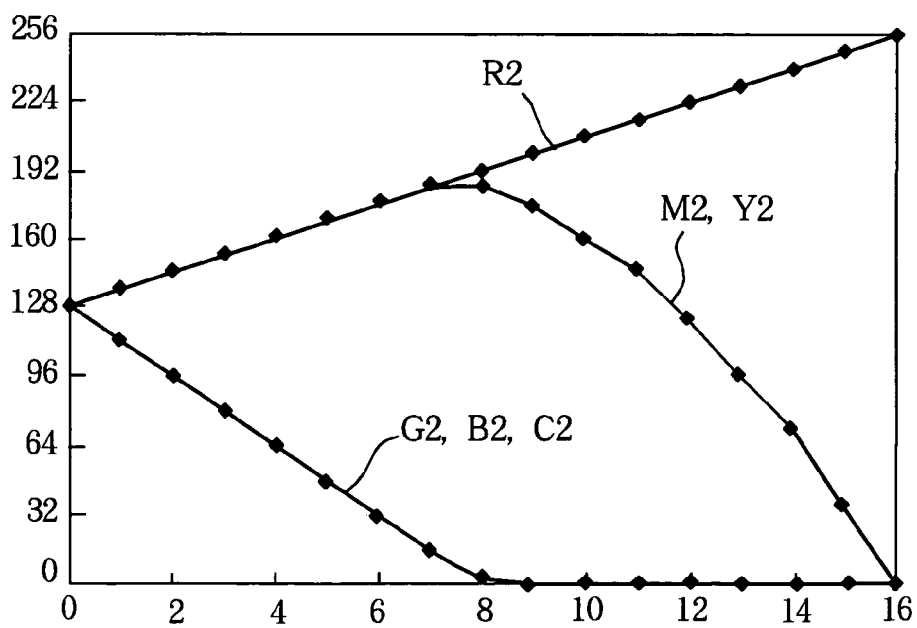
FIG. 20 shows exemplary second color data.

FIG. 20 shows the second color data obtained by the above equation (11); the horizontal axis indicates the data index number and the vertical axis indicates the value of the second color data. The second color data R2, G2, B2, C2, M2, Y2 are given by the above equation (9) in the region where the characteristic information CH has a small value, and by the above equation (10) in the region where the characteristic information CH has a large value. The color with data index number zero is achromatic (all components of the second color data have a value of 128, corresponding to the white color W0 in FIG. 15); at data index number eight or nine, a color (corresponding to A1 in FIG. 15) is produced from just three of the six second color data components (R2, M2, Y2); and at the data index number sixteen, a color (corresponding to the primary color R0 in FIG. 15) is produced from the R2 component alone. Colors between these data index numbers are produced by mixing the above second color data components. Colors with data index numbers from one to eight, such as color A2 in FIG. 15, are produced by mixing W0 and A1 in FIG. 15, and colors with data index numbers nine to sixteen, such as color A2 in FIG. 15, are produced by mixing A1 and R0 in FIG. 15.

As described above, according to the color data conversion apparatus of the present embodiment, when a color is expressed by six primary colors (more generally, by four or more primary colors), it is possible to optimize the combination and balance of the second color data to be used, according to the value of the characteristic information CH, so that accurate color data conversion can be carried out. As an example, combinations of second color data that can reproduce colors of maximum brightness and maximum saturation can be selected for different ranges of values of the characteristic information CH. As another example, by adjusting the matrix coefficient values, it is possible to adjust color reproduction using the second color data by making independent adjustments for each of the hues red, yellow, green, cyan, blue, and magenta, as well as by making separate adjustments for different ranges of values of the characteristic information CH.

In the color data conversion apparatus of the present embodiment, the characteristic information CH is obtained as the sum of the brightness information and saturation information, but CH may also be obtained from the brightness information alone, or from the saturation information alone. If the characteristic information CH is obtained from the brightness information alone, it is possible to change the combination and balance of the second color data according to the brightness of the first color data. If the characteristic information CH is obtained from the saturation information alone, it is possible to change the combination and balance of the second color data according to the saturation of the first color data.

In the color data conversion apparatus of the present embodiment, the second and third hue region data are obtained by multiplying the first hue region data by multiplier coefficients, but the structures for obtaining the second and third hue region data are not limited to this scheme. For example, a lookup table addressed by the characteristic information and the first hue region data may be used instead. When the second and third hue region data are obtained by multiplying the first hue region data by multiplier coefficients, however, they can be obtained by simple arithmetic calculations, without using a large amount of memory space. The color data conversion apparatus in the present embodiment is configured so as to generate the multiplier coefficients from a lookup table, but the multiplier coefficients themselves may be calculated by using arithmetic and logic circuits.

Figure 21:
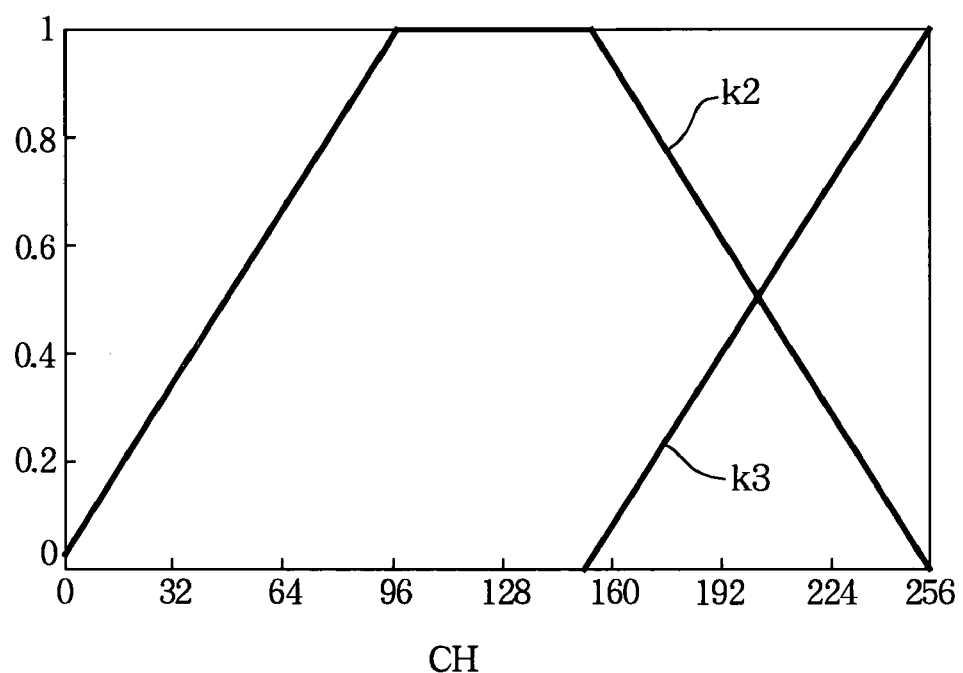
FIG. 21 shows other exemplary multiplier coefficients.

In the color data conversion apparatus of the present embodiment, the sum of the second and third hue region data is made equal to the first hue region data, but the first, second, and third hue region data are not necessarily restricted to this relationship. FIG. 21 shows another example of the multiplier coefficients k2, k3, where the horizontal axis indicates the value of the characteristic information CH and the vertical axis indicates the values of the multiplier coefficients. When the multiplier coefficients shown in FIG. 21 are used, the second color data values decrease uniformly as the characteristic information CH approaches zero. If brightness information is used as the characteristic information and the first image data represent a comparatively dark image, the values of the second image data are significantly reduced, so that the dark image is converted to a darker image, creating a strong sense of contrast.

In combination, the lookup table 14 in the characteristic information calculation means 10 and the second and third hue region data calculation means 4 constitute a means for adjusting the magnitudes of a plurality of first hue region data values (h1$p$1, h1$q$1) by using the characteristic information from the characteristic information calculation means 10 to obtain second and third hue region data (h1$p$2, h1$q$2, h1$p$3, h1$q$3) for each of a plurality of first hue region data values.

Second Embodiment

Figure 22:
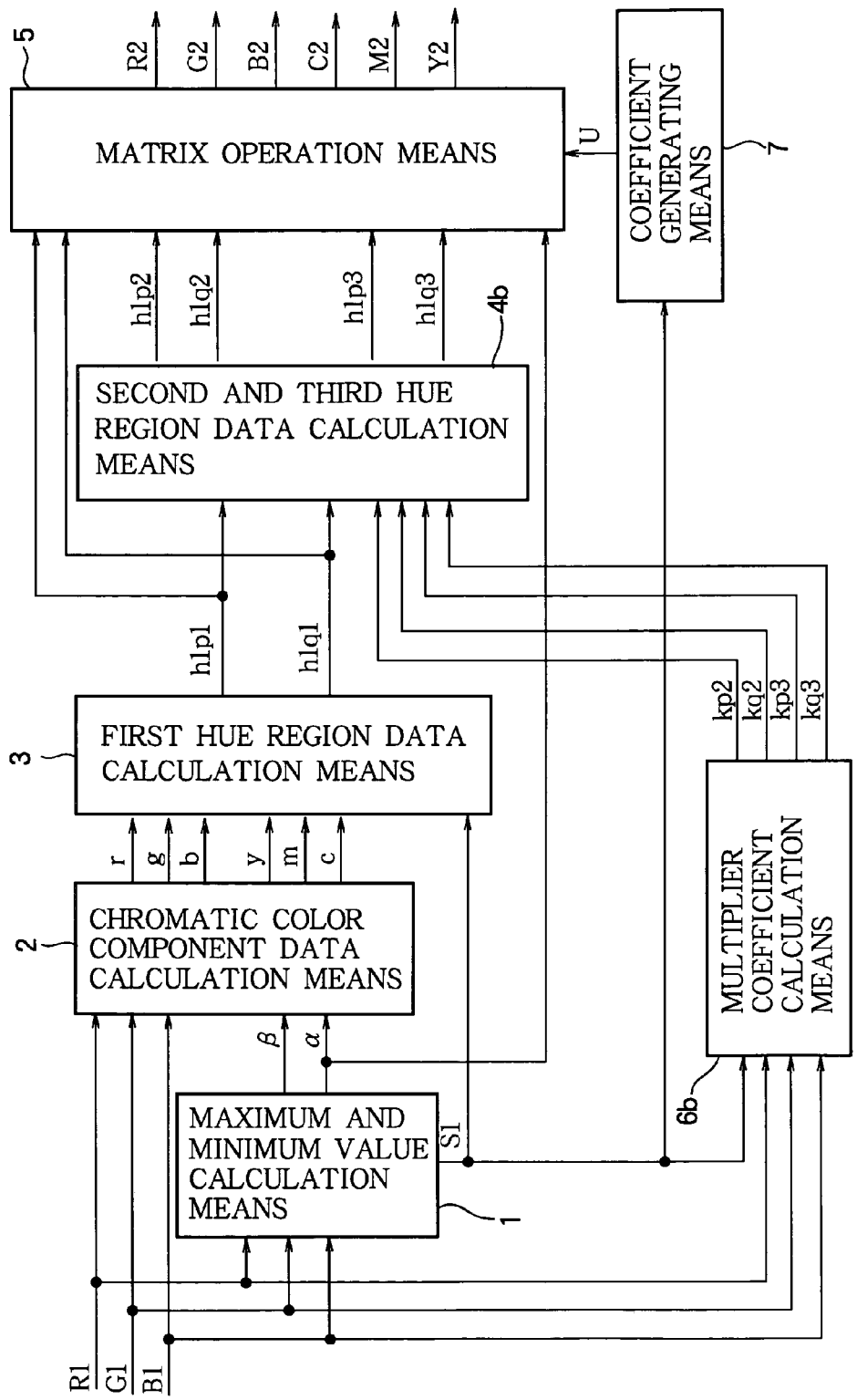
FIG. 22 is a block diagram illustrating a color data conversion apparatus according to a second embodiment of the invention.

Referring to FIG. 22, the color data conversion apparatus in the second embodiment comprises a maximum and minimum value calculation means 1, a chromatic color component data calculation means 2, a first hue region data calculation means 3, a second and third hue region data calculation means 4$b$, a matrix operation means 5, a multiplier coefficient calculation means 6$b$, and a coefficient generating means 7. The maximum and minimum value calculation means 1, chromatic color component data calculation means 2, first hue region data calculation means 3, matrix operation means 5, and coefficient generating means 7 are the same as in the first embodiment described above.

In the drawing, R1, G1, and B1 indicate first color data for the three colors red, green, and blue. The first color data R1, G1, B1 are input to the maximum and minimum value calculation means 1, chromatic color component data calculation means 2, and multiplier coefficient calculation means 6$b$. The maximum and minimum value calculation means 1 selects and outputs the maximum value β and minimum value α of the first color data R1, G1, B1 and generates an identification code S1 indicating the colors in which the maximum and minimum values occur. The output maximum value β and minimum value α are input to the chromatic color component data calculation means 2. The minimum value α is also input to the matrix operation means 5. The identification code S1 is input to the first hue region data calculation means 3, coefficient generating means 7, and multiplier coefficient calculation means 6$b$.

The chromatic color component data calculation means 2 receives the first color data R1, G1, B1 and the maximum value β and the minimum value α, and outputs six items of chromatic component data r, g, b, y, m, and c, which are sent to the first hue region data calculation means 3. The first hue region data calculation means 3 generates first hue region data h1$q$1, h1$p$1 valid for a pair of hues among the six hues red, green, blue, yellow, magenta, and cyan, on the basis of the identification code S1 and the six items of chromatic component data r, g, b, y, m, and c, and transmits them to the second and third hue region data calculation means 4$b$. The value of first hue region data h1$q$1 is one of h1$y$=min(r, g), h1$m$=min(b, r), and h1$c$=min(g, b), and the value of first hue region data h1$p$1 is one of h1$r$=min(y, m), h1$g$=min(c, y), and h1$b$=min(m, c).

Figure 23:
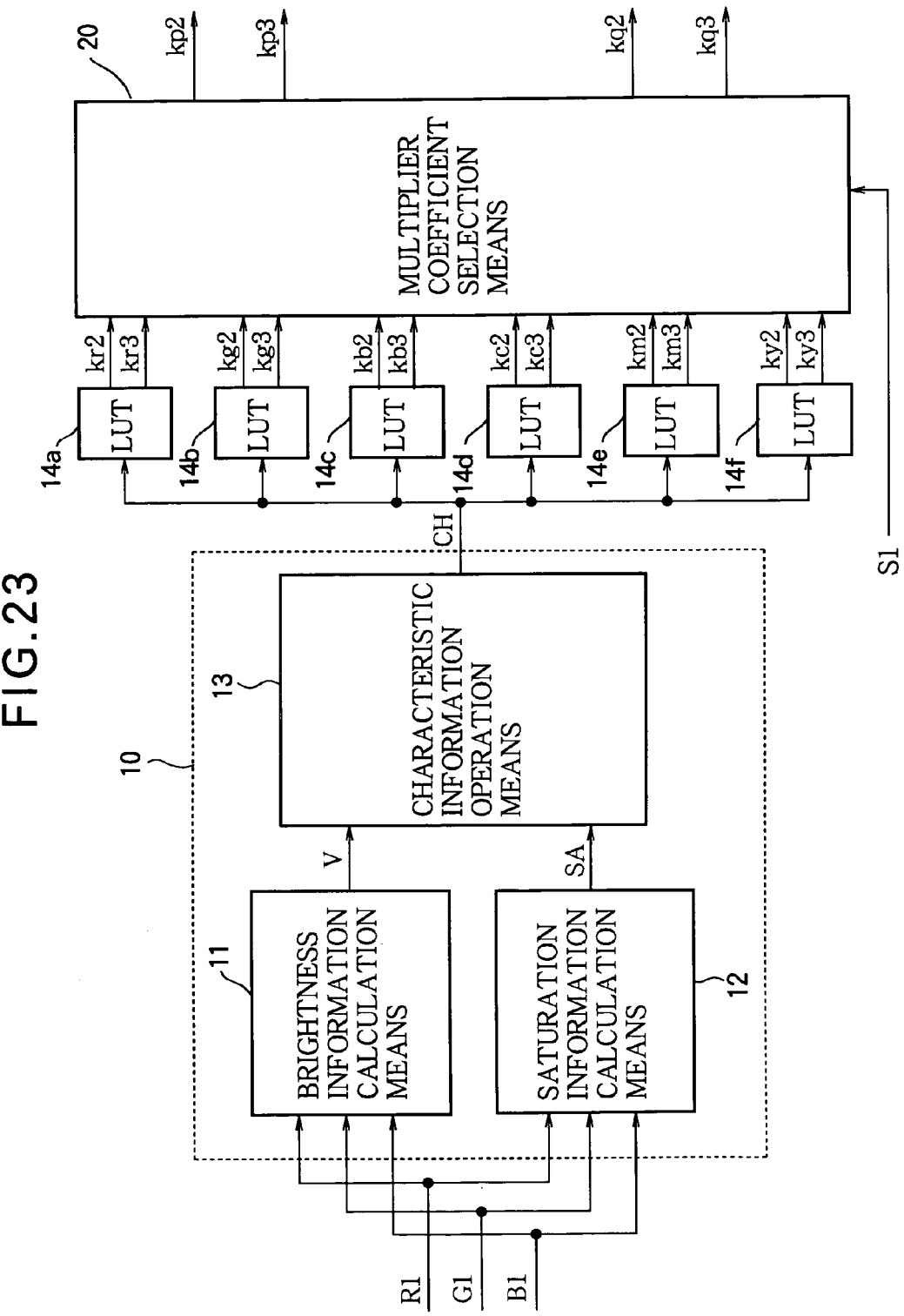
FIG. 23 is a block diagram illustrating an exemplary internal structure of the multiplier coefficient calculation means in FIG. 22.

The multiplier coefficient calculation means 6$b$ receives the first color data R1, G1, B1, and the identification code S1 as inputs. FIG. 23 is a block diagram illustrating an exemplary structure of the multiplier coefficient calculation means 6$b$, including a characteristic information calculation means 10, a brightness information calculation means 11, a saturation information calculation means 12, a characteristic information operation means 13, lookup tables (LUTs) 14$a$ to 14$f$, and a multiplier coefficient selection means 20. The characteristic information calculation means 10 receives the first color data R1, G1, B1 and calculates characteristic information CH thereof, which is output to the lookup tables 14$a$ to 14$f$.

The characteristic information calculation means 10 comprises brightness information calculation means 11, saturation information calculation means 12, and characteristic information operation means 13. The first color data R1, G1, B1 input to the characteristic information calculation means 10 are supplied to the brightness information calculation means 11 and saturation information calculation means 12. The brightness information calculation means 11 calculates and outputs brightness information V expressing the brightness value of the color represented by the R1, G1, and B1 data. The saturation information calculation means 12 calculates and outputs saturation information SA expressing the colorfulness or vibrancy of the color represented by the R1, G1, and B1 data. The characteristic information operation means 13 calculates and outputs the characteristic information CH from the brightness information V and saturation information SA.

The lookup tables 14a to 14f are configured as, for example, memories that store multiplier coefficients kr2, kr3, kg2, kg3, kb2, kb3, kc2, kc3, km2, km3, ky2, ky3 corresponding to the characteristic information CH, which is used as an address. The lookup tables 14a to 14f thus receive the characteristic information CH as a read address and output the corresponding multiplier coefficients. Lookup table 14a stores the multiplier coefficients kr2, kr3 for the second and third hue region data valid for the red hue corresponding to each value of the characteristic information CH, and, upon input of the characteristic information CH, outputs the corresponding multiplier coefficients kr2, kr3. Similarly, lookup tables 14b to 14f store the multiplier coefficients kg2, kg3, kb2, kb3, kc2, kc3, km2, km3, ky2, ky3 for the second and third hue region data valid for the respective green, blue, cyan, magenta, and yellow hues corresponding to each value of the characteristic information CH, and, upon input of the characteristic information CH, output the corresponding multiplier coefficients kg2, kg3, kb2, kb3, kc2, kc3, km2, km3, ky2, ky3.

The multiplier coefficient selection means 20 selects, according to the identification code S1, two multiplier coefficients from among the multiplier coefficients kr2, kg2, kb2, ky2, km2, kc2 as kp2 and kq2, and two multiplier coefficients from among the multiplier coefficients kr3, kg3, kb3, ky3, km3, kc3 as kp3 and kq3. When h1y is selected as first hue region data h1q1, multiplier coefficients ky2 and ky3 are selected as kq2 and kq3, respectively; when h1m is selected as first hue region data h1q1, multiplier coefficients km2 and km3 are selected as kq2 and kq3, respectively; and when h1c is selected as first hue region data h1q1, multiplier coefficients kc2 and kc3 are selected as kq2 and kq3, respectively. When h1r is selected as first hue region data h1p1, multiplier coefficients kr2 and kr3 are selected as kp2 and kp3, respectively; when h1g is selected as first hue region data h1p1, multiplier coefficients kg2 and kg3 are selected as kp2 and kp3, respectively; and when h1b is selected as first hue region data h1p1, multiplier coefficients kb2 and kb3 are selected as kp2 and kp3, respectively. The selected multiplier coefficients kp2, kq2, kp3, kq3 are output from the multiplier coefficient calculation means 6b.

The multiplier coefficients kp2, kq2, kp3, kq3 output from the multiplier coefficient calculation means 6b are input to the second and third hue region data calculation means 4b together with the first hue region data h1p1, h1q1.

Figure 24:
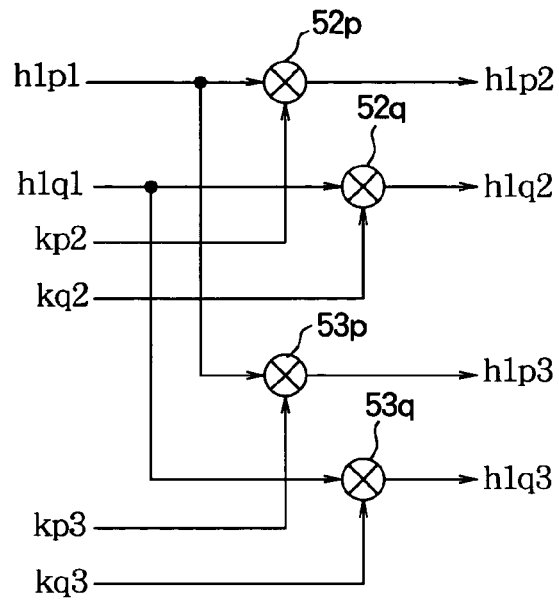
FIG. 24 is a block diagram illustrating an exemplary internal structure of the second and third hue region data calculation means in FIG. 22.

FIG. 24 is a block diagram illustrating an exemplary structure of the second and third hue region data calculation means 4b. Referring to FIG. 24, the second and third hue region data calculation means 4b comprises multipliers 52p, 52q, 53p, 53q. Multiplier 52p multiplies first hue region data h1p1 by multiplier coefficient kp2 to obtain second hue region data h1p2. Multiplier 52q multiplies first hue region data h1q1 by multiplier coefficient kq2 to obtain second hue region data h1q2. Multiplier 53p multiplies first hue region data h1p1 by multiplier coefficient kp3 to obtain third hue region data h1p3. Multiplier 53q multiplies first hue region data h1q1 by multiplier coefficient kq3 to obtain third hue region data h1q3. Thus a different set of multiplier coefficients (kp2, kq2, kp3, kq3) is furnished for each hue region, and the first hue region data are multiplied by multiplier coefficients to generate the second and third hue region data.

In the second hue region data, h1q2 is one of h1y2 (=ky2*h1y), h1m2 (=km2*h1m), and h1c2 (=kc2*h1c), and h1p2 is one of h1r2 (=kr2*h1r), h1g2 (=kg2*h1g), and h1b2 (=kb2*h1b). In the third hue region data, h1q3 is one of h1y3 (=ky3*h1y), h1m3 (=km3*h1m), and h1c3 (=kc3*h1c), and h1p3 is one of h1r3 (=kr3*h1r), h1g3 (=kg3*h1g), and h1b3 (=kb3*h1b).

The multiplier coefficients kr2, kg2, kb2, kc2, km2, and ky2 by which the first hue region data are multiplied to generate the second hue region data and the multiplier coefficients kr3, kg3, kb3, kc3, km3, and ky3 by which the first hue region data are multiplied to generate the third hue region data are valid only for the hues for which the corresponding hue region data are valid. Accordingly, the second and third hue region data values of a hue of interest can be adjusted independently of the other hues by adjusting the values of the multiplier coefficients. The magnitudes of the values of the second and third hue region data relate to the contributions thereof to the generation of the second color data.

The coefficient generating means 7 receives the identification code S1, selects a corresponding set of matrix coefficients U(Fij), applicable to hue region data valid for the relevant pixel, from among its prestored matrix coefficients, and outputs the selected matrix coefficients to the matrix operation means 5. The coefficient generating means 7 stores matrix coefficients for the second and third hue region data of each of the six hues red, yellow, green, cyan, blue, and magenta, that is, matrix coefficients for h1r2, h1g2, h1b2, h1y2, h1m2, and h1c2, and h1r3, h1g3, h1b3, h1y3, h1m3, and h1c3, from which it selects and outputs an appropriate set of matrix coefficients according to the value of the identification code S1. The coefficient generating means 7 also outputs a coefficient for the minimum value α.

The matrix operation means 5 operates on the second hue region data, third hue region data, and minimum value α by performing a matrix operation, using the matrix coefficients output from the coefficient generating means 7, to obtain the second color data R2, G2, B2, C2, M2, Y2.

In the color data conversion apparatus of the present embodiment, matrix coefficients are provided individually for each of the six hues red, yellow, green, cyan, blue, and magenta, and the multiplier coefficients by which the first hue region data are multiplied to generate the second and third hue region data are also provided individually for each of the six hues. Accordingly, the values of the multiplier coefficients corresponding to the characteristic information can also be varied for each of the six hues. In the color conversion apparatus of the second embodiment, upon generation of the second color data, the range of values of the characteristic information CH in which the second and third hue region data (i.e., the matrix coefficients for the second and third hue region data) make their main contributions can be individually determined for each of the six hues red, yellow, green, cyan, blue, and magenta, so that accurate color data conversion can be carried out.

Figure 25:
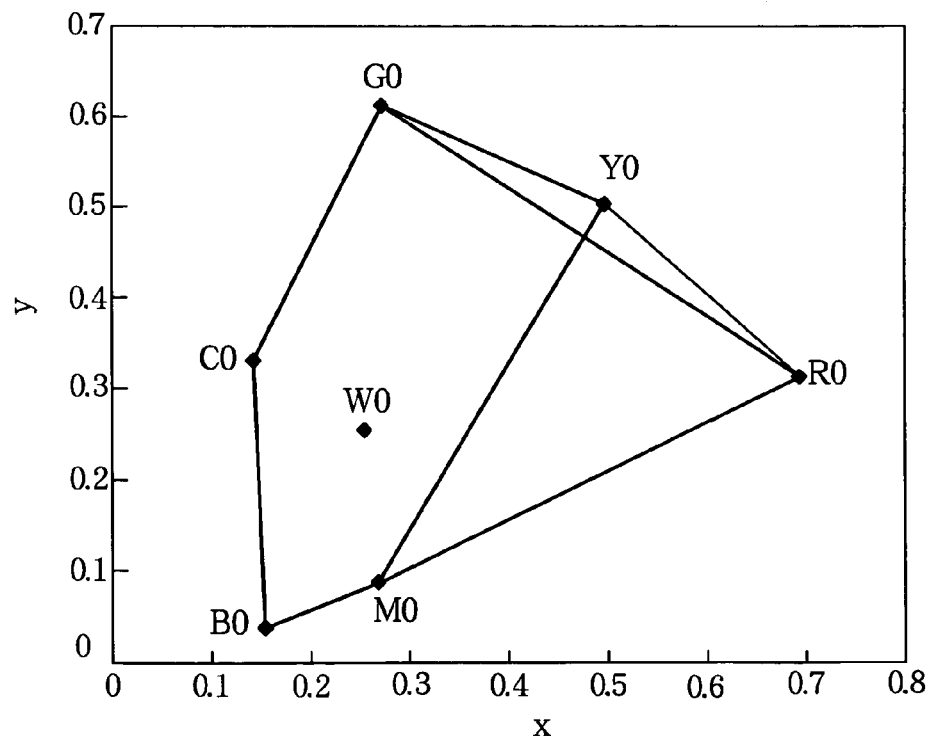
FIG. 25 is an XY chromaticity diagram showing an example of the gamut of colors reproduced by the second color data.

FIG. 25 is an XY chromaticity diagram showing an example of the gamut of colors reproduced by the six primary colors R0, Y0, G0, C0, B0, M0. If highly saturated colors are expressed by using three primary colors, a red hue with a high saturation, for example, can be expressed in terms of R0, Y0, and M0, and a yellow hue with a high saturation can be expressed in terms of Y0, R0, and G0. The gamut of colors that can be expressed by R0, Y0, and M0 corresponds to the interior of the triangle with vertices R0, Y0, M0 in FIG. 25; the gamut of colors that can be expressed by Y0, R0, and G0 corresponds to the interior of the triangle with vertices Y0, R0, G0 in FIG. 25. It is apparent from FIG. 25 that, among colors that can be expressed by three consecutive primary colors, yellow is restricted to a higher saturation region than red, but even so, the color data conversion apparatus in the second embodiment can make appropriate adjustments for both colors, because the values of the multiplier coefficients for generating the second and third hue region data can be varied for each of the hues.

In the color data conversion apparatus of the second embodiment, the values of the multiplier coefficients for generating the second and third hue region data can also be varied for each of the hues so as to reproduce appropriate colors in consideration of human visual characteristics and sensitivity.

Third Embodiment

Figure 26:
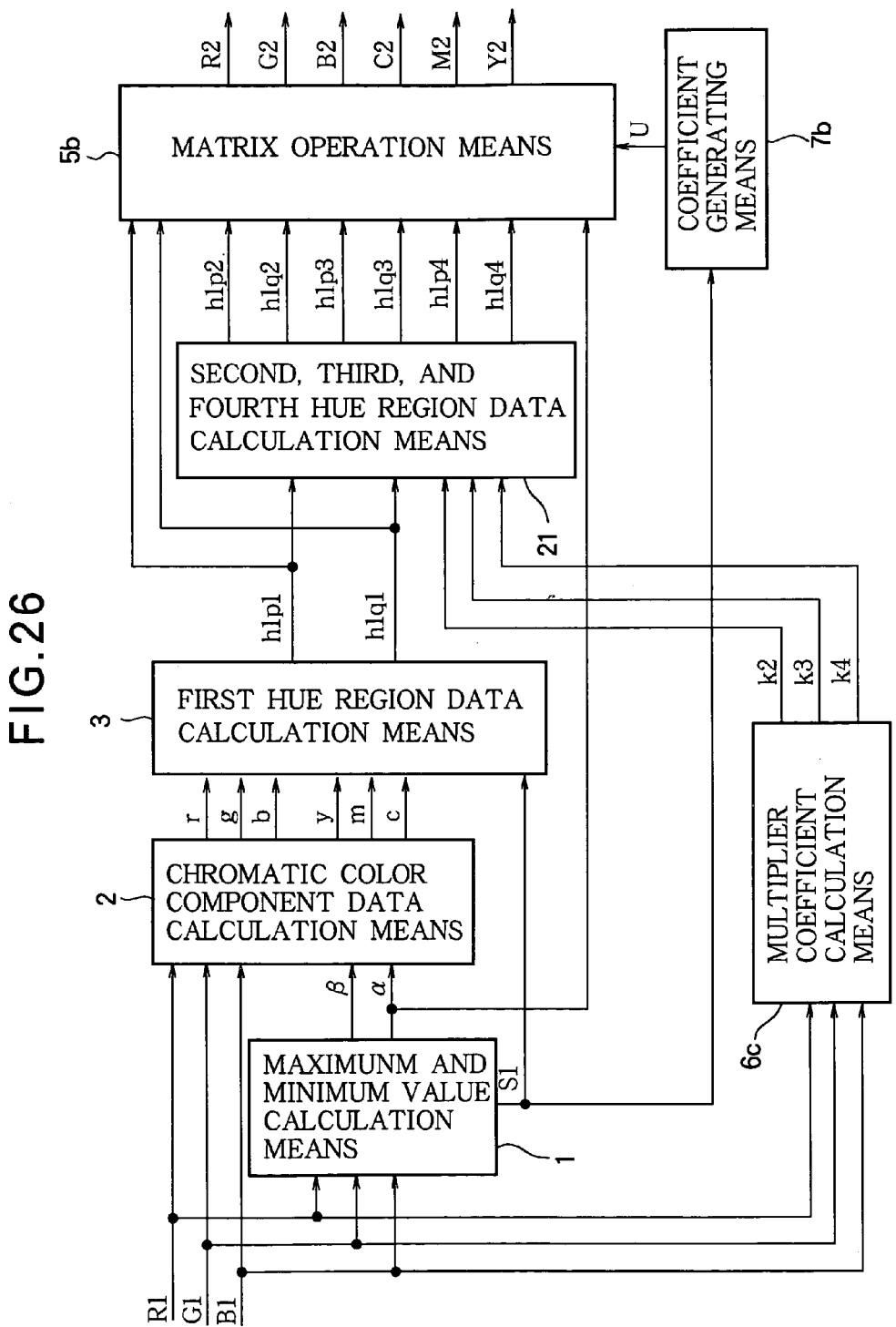
FIG. 26 is a block diagram illustrating a color data conversion apparatus according to a third embodiment of the invention.

Referring to FIG. 26, the color data conversion apparatus in the third embodiment comprises a maximum and minimum value calculation means 1, a chromatic color component data calculation means 2, a first hue region data calculation means 3, a second, third, and fourth hue region data calculation means 21, a matrix operation means 5b, a multiplier coefficient calculation means 6c, and a coefficient generating means 7b. The maximum and minimum value calculation means 1, chromatic color component data calculation means 2, and first hue region data calculation means 3 are the same as in the first embodiment described above.

The maximum and minimum value calculation means 1 outputs the maximum value β and minimum value α of the first color data R1, G1, and B1, and generates an identification code S1. The chromatic color component data calculation means 2 receives the first color data R1, G1, B1 and the maximum value β and the minimum value α, and outputs six items of chromatic component data r, g, b, y, m, and c. The first hue region data calculation means 3 generates first hue region data h1$q$1, h1$p$1 valid for a particular pair of hues among the six hues red, green, blue, yellow, magenta, and cyan, on the basis of the identification code S1 and the six items of chromatic component data r, g, b, y, m, and c. These operations are the same as in the first embodiment described above.

Figure 27:
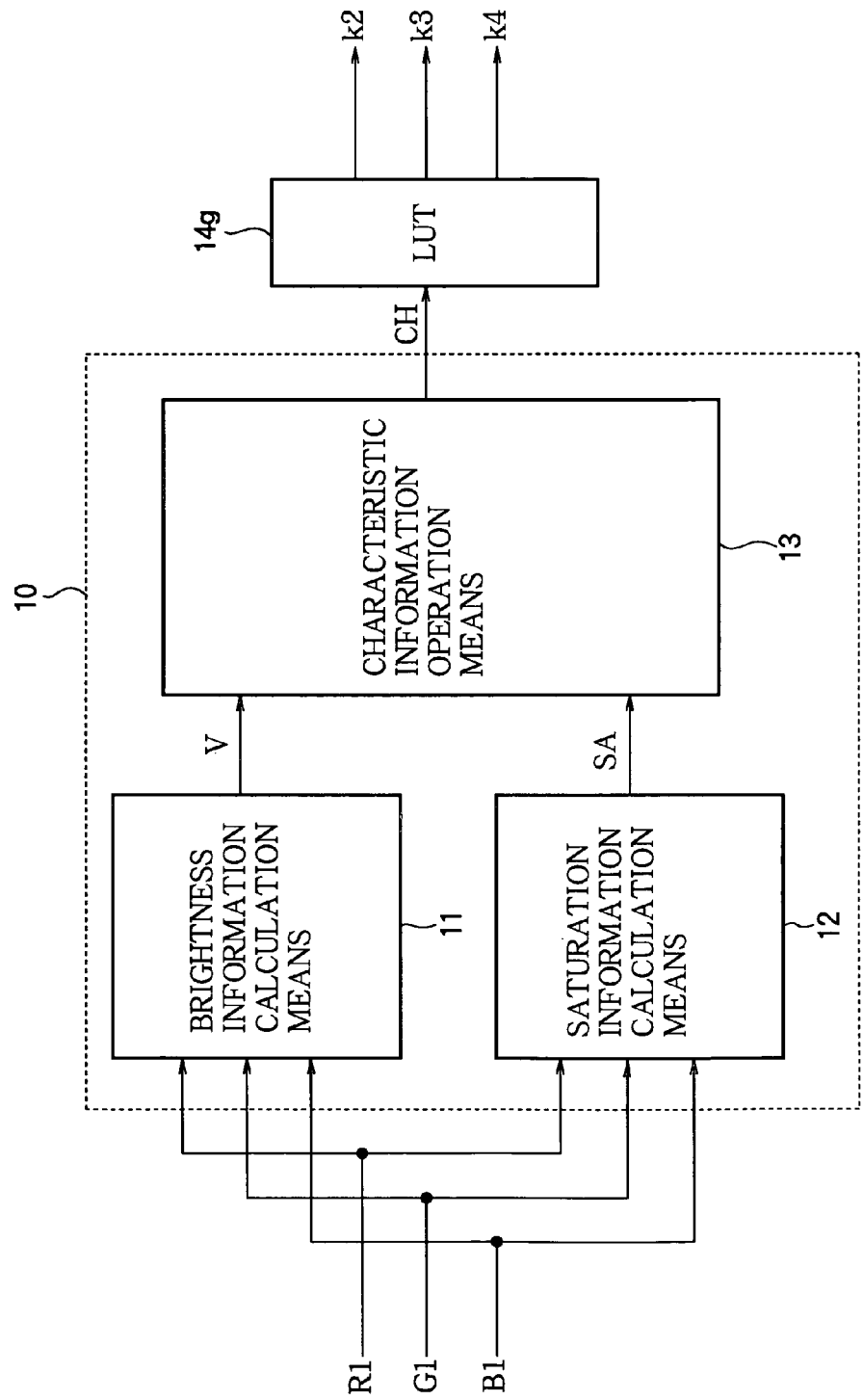
FIG. 27 is a block diagram illustrating an exemplary internal structure of the multiplier coefficient calculation means in FIG. 26.

The multiplier coefficient calculation means 6c receives the first color data R1, G1, B1 as shown in FIG. 26. FIG. 27 is a block diagram illustrating an exemplary internal structure of the multiplier coefficient calculation means 6c, including a characteristic information calculation means 10, a brightness information calculation means 11, a saturation information calculation means 12, a characteristic information operation means 13, and a lookup table (LUT) 14g. The characteristic information calculation means 10, which comprises the brightness information calculation means 11, saturation information calculation means 12, and characteristic information operation means 13, is the same as in the first embodiment; it receives the first color data R1, G1, B1 and outputs the characteristic information CH thereof to the lookup table 14g. The lookup table 14g stores multiplier coefficients k2, k3, k4 corresponding to the characteristic information CH, which is used as an address. The lookup table 14g thus receives the characteristic information CH as a read address and outputs the corresponding multiplier coefficients.

The multiplier coefficients k2, k3, k4 output from the multiplier coefficient calculation means 6c are input to the second, third, and fourth hue region data calculation means 21 together with the first hue region data h1$p$1, h1$q$1.

Figure 28:
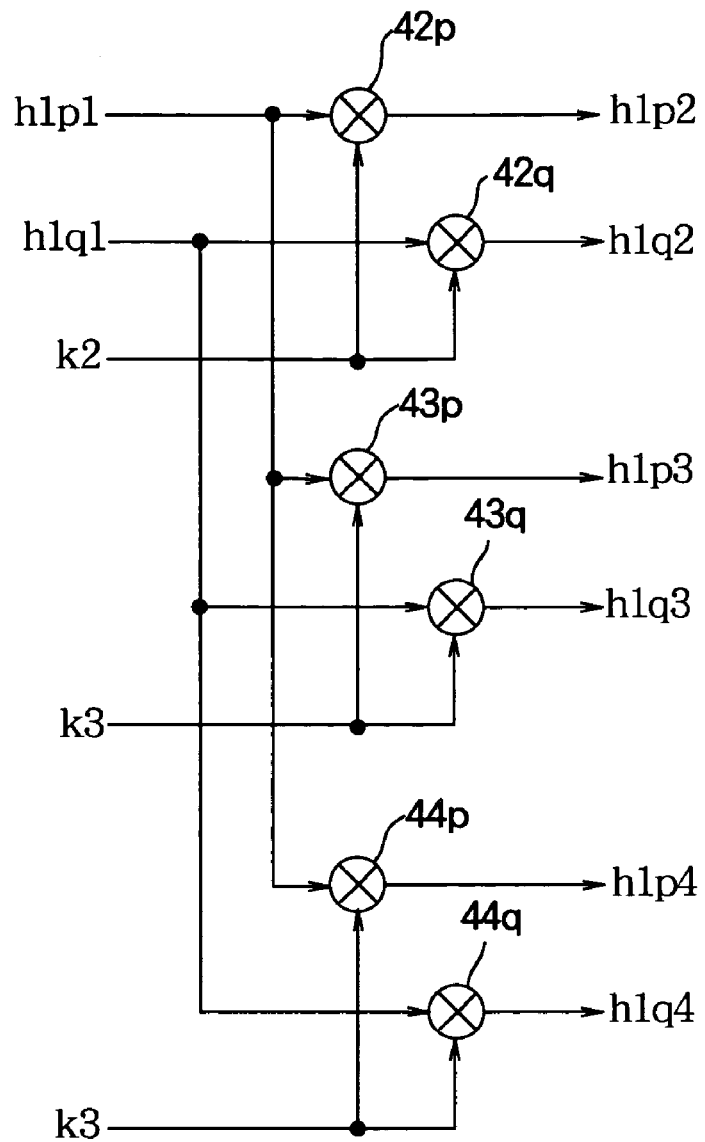
FIG. 28 is a block diagram illustrating an exemplary internal structure of the second, third, and fourth hue region data calculation means in FIG. 26.

FIG. 28 is a block diagram illustrating an exemplary internal structure of the second, third, and fourth hue region data calculation means 21. The second, third, and fourth hue region data calculation means 21 in FIG. 28 comprises multipliers 42$p$, 42$q$, 43$p$, 43$q$, 44$p$, 44$q$. Multipliers 42$p$, 42$q$ multiply the first hue region data h1$p$1, h1$q$1 by the second multiplier coefficient k2 to obtain second hue region data h1$p$2, h1$q$2. Multipliers 43$p$, 43$q$ multiply the first hue region data h1$p$1, h1$q$1 by the third multiplier coefficient k3 to obtain third hue region data h1$p$3, h1$q$3. Multipliers 44$p$, 44$q$ multiply the first hue region data h1$p$1, h1$q$1 by the fourth multiplier coefficient k4 to obtain fourth hue region data h1$p$4, h1$q$4.

The coefficient generating means 7b receives the identification code S1, selects a corresponding set of matrix coefficients U(Fij), applicable to hue region data valid for the relevant pixel, from among its prestored matrix coefficients, and outputs the selected matrix coefficients to the matrix operation means 5b. The coefficient generating means 7b stores matrix coefficients for the second, third, and fourth hue region data for each of the six hues red, yellow, green, cyan, blue, and magenta, and selects and outputs appropriate matrix coefficients depending on the value of the identification code S1. The coefficient generating means 7b also outputs a coefficient for the minimum value α. The matrix operation means 5b operates on the second hue region data, third hue region data, fourth hue region data, and minimum value α by performing a matrix operation, using the matrix coefficients output from the coefficient generating means 7b, to obtain the second color data R2, G2, B2, C2, M2, Y2.

Figure 29:
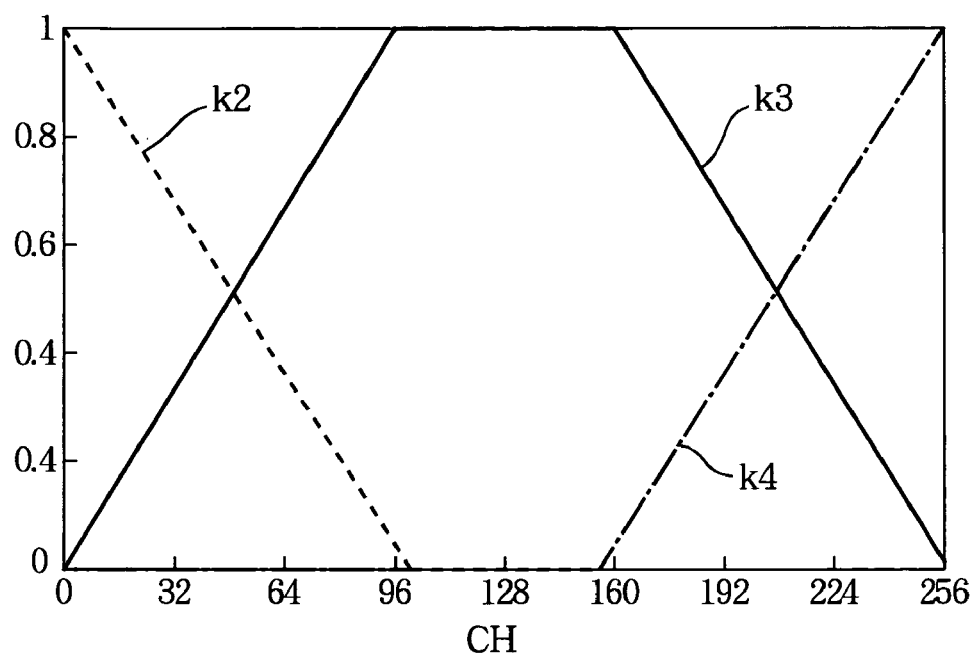
FIG. 29 shows exemplary multiplier coefficients.

FIG. 29 shows exemplary multiplier coefficients k2, k3, and k4 as functions of the characteristic information CH. In FIG. 29, the horizontal axis indicates the value of the characteristic information CH, and the vertical axis indicates the values of the multiplier coefficients. When the characteristic information CH is zero, the multiplier coefficients shown in FIG. 29 are k2=1 and k3=k4=0. As the value of the characteristic information CH increases from zero toward one hundred (100), multiplier coefficient k2 decreases and multiplier coefficient k3 increases. When the value of the characteristic information CH is 100 or more, but is less than 154, the multiplier coefficients are k3=1 and k2=k4=0. As the value of the characteristic information CH increases beyond 154, multiplier coefficient k3 decreases and multiplier coefficient k4 increases, reaching k2=k3=0 and k4=1 at CH=255. Therefore, the effect of the second hue region data predominates in a region of colors with comparatively small characteristic information (CH<50), the effect of the third hue region data predominates in an intermediate range of characteristic information values (50<CH<205), and the effect of the fourth hue region data predominates in a region of comparatively large characteristic information (205<CH). When the value of the characteristic information CH is from 100 to 154, only the third hue region data are used in generating the second color data.

According to the color data conversion apparatus of the third embodiment, when a color is expressed by six primary colors (more generally, by four or more primary colors), it is possible to change the combination and balance (or mixing ratio) of the second color data so as to obtain an appropriate combination and balance by selecting from among three or more types of combinations according to the value of the characteristic information CH. As a result, more accurate color data conversion can be carried out.

In the third embodiment, second to fourth hue region data are generated for each item of first hue region data, but still more hue region data may be generated. In the general case, second to N-th hue region data may be generated (where N is an integer equal to or greater than three). The second to N-th hue region data are given comparatively large values within different ranges of the characteristic information. For example, the multiplier coefficients used for generating the second to N-th hue region data may be given comparatively large values within different ranges of the characteristic information.

Fourth Embodiment

Figure 30:
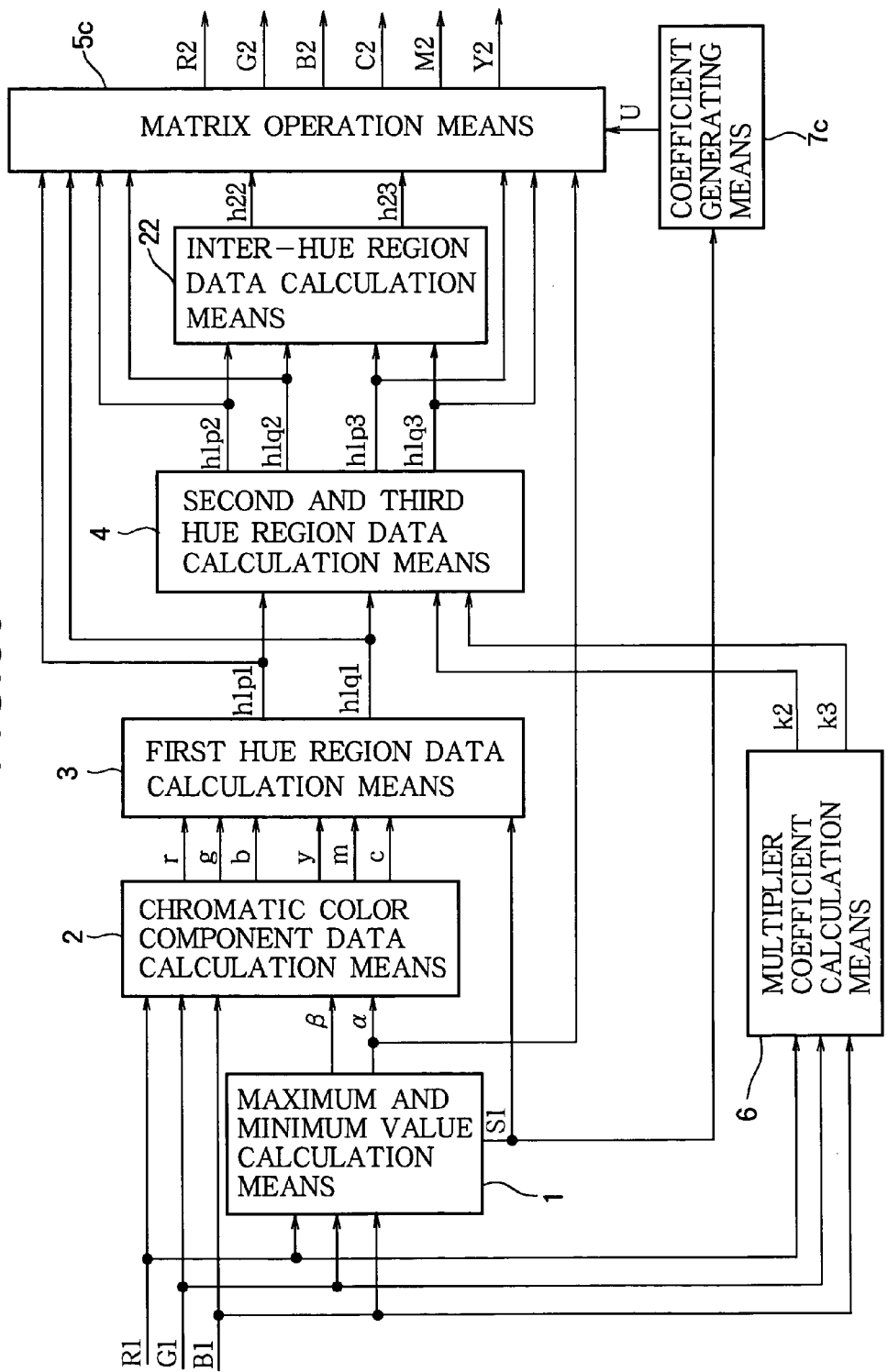
FIG. 30 is a block diagram illustrating a color data conversion apparatus according to a fourth embodiment of the invention.
Figure 32A:
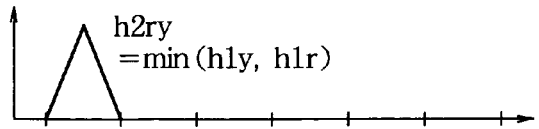
FIGS. 32A, 32B, 32C, 32D, 32E, and 32F schematically show relationships between hues and inter-hue region data.
Figure 32B:
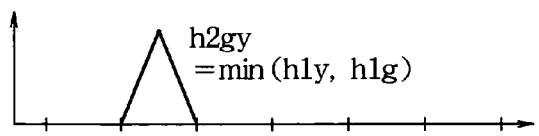
Figure 32C:
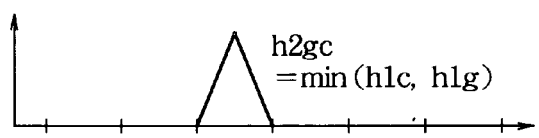
Figure 32D:
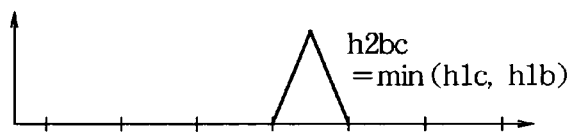
Figure 32E:
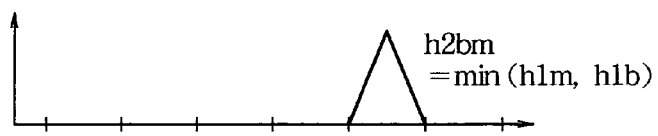
Figure 32F:
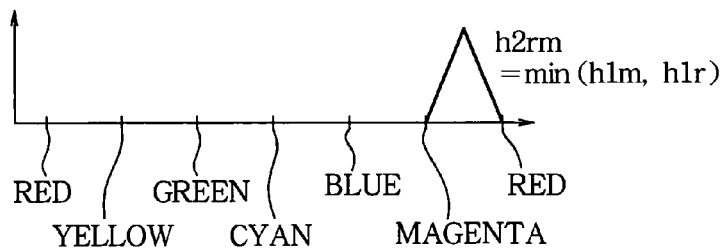

Referring to FIG. 30, the color data conversion apparatus in the fourth embodiment comprises a maximum and minimum value calculation means 1, a chromatic color component data calculation means 2, a first hue region data calculation means 3, a second and third hue region data calculation means 4, a matrix operation means 5c, a multiplier coefficient calculation means 6, a coefficient generating means 7c, and an inter-hue region data calculation means 22. The maximum and minimum value calculation means 1, chromatic color component data calculation means 2, first hue region data calculation means 3, second and third hue region data calculation means 4, and multiplier coefficient calculation means 6 are the same as in the first embodiment described above.

The maximum and minimum value calculation means 1 outputs the maximum value $\beta$ and minimum value $\alpha$ of the first color data R1, G1, and B1, and generates the identification code S1. The chromatic color component data calculation means 2 receives the first color data R1, G1, B1 and the maximum value $\beta$ and the minimum value $\alpha$, and outputs six items of chromatic component data r, g, b, y, m, and c. The first hue region data calculation means 3 generates first hue region data h1$q$1, h1$p$1 valid for a pair of hues among the six hues red, green, blue, yellow, magenta, and cyan, on the basis of the identification code S1 and the six items of chromatic component data r, g, b, y, m, and c. The multiplier coefficient calculation means 6 receives the first color data R1, G1, B1, calculates the characteristic information CH thereof, and outputs multiplier coefficients k2, k3 corresponding to the characteristic information CH. These operations are the same as in the first embodiment described above.

The multiplier coefficients k2, k3 output from the multiplier coefficient calculation means 6 are input to the second and third hue region data calculation means 4 together with the first hue region data h1$p$1, h1$q$1. The first hue region data h1$p$1, h1$q$1 are multiplied by the multiplier coefficient k2 to obtain the second hue region data h1$p$2, h1$q$2, and are multiplied by the multiplier coefficient k3 to obtain the third hue region data h1$p$3, h1$q$3. These operations are also the same as in the first embodiment. The second hue region data h1$p$2, h1$q$2 and the third hue region data h1$p$3, h1$q$3 are supplied to the inter-hue region data calculation means 22 and matrix operation means 5c.

The inter-hue region data calculation means 22 selects and outputs the smaller value of the second hue region data h1$p$2, h1$q$2 as inter-hue region data h22=min(h1$p$2, h1$q$2), and the smaller value of the third hue region data h1$p$3, h1$q$3 as inter-hue region data h23=min(h1$p$3, h1$q$3). That is, the inter-hue region data h22, h23 are one of h2$ry$=min(h1$r$, h1$y$), h2$gy$=min(h1$g$, h1$y$), h2$gc$=min(h1$g$, h1$c$), h2$bc$=min(h1$b$, h1$c$), h2$bm$=min(h1$b$, h1$m$), and h2$rm$=min(h1$r$, h1$m$) each multiplied by the multiplier coefficient k2 or k3. Which one of h2$ry$, h2$gy$, h2$gc$, h2$bc$, h2$bm$, and h2$rm$ is multiplied by the multiplier coefficient to obtain the inter-hue region data h22, h23 depends on the identification code S1, which may vary from pixel to pixel. FIG. 31 illustrates relationships between the identification code S1 and inter-hue region data h22, h23.

Each item of inter-hue region data h2$ry$, h2$gy$, h2$gc$, h2$bc$, h2$bm$, h2$rm$ has a non-zero value only in a particular inter-hue region; that is, it is valid only for a particular inter-hue region. The term 'inter-hue region' is used here to mean a region between two adjacent hues among the hues red, green, blue, cyan, yellow, and magenta. FIG. 32 schematically shows relationships between the six hues and the inter-hue region data h2$ry$, h2$gy$, h2$gc$, h2$bc$, h2$bm$, h2$rm$. It is apparent from FIG. 32 that non-zero inter-hue region data occur in the six inter-hue regions between red and yellow, between yellow and green, between green and cyan, between cyan and blue, between blue and magenta, and between magenta and red.

Since the inter-hue region data h2$ry$, h2$gy$, h2$gc$, h2$bc$, h2$bm$, h2$rm$ are valid in different inter-hue regions, the products obtained by multiplying the inter-hue region data by the multiplier coefficient k2 or k3 also become valid in these particular inter-hue regions. Among these products, the products valid for the relevant pixel are selectively output as h22 and h23 and sent to the matrix operation means 5c.

The coefficient generating means 7c selects, according to the value of the identification code S1, appropriate matrix coefficients U(Fij) for the relevant pixel from among its pre-stored matrix coefficients, and outputs them to the matrix operation means 5c. The coefficient generating means 7c stores the matrix coefficients for the second and third hue region data of each of the six hues red, yellow, green, cyan, blue, and magenta, and the matrix coefficients for the inter-hue region data in each of the inter-hue regions, and selects and outputs appropriate matrix coefficients depending on the value of the identification code S1. The coefficient generating means 7c also outputs a coefficient for the minimum value $\alpha$. The matrix operation means 5c operates on the second hue region data, third hue region data, inter-hue region data, and minimum value $\alpha$ by performing a matrix operation using the matrix coefficients output from the coefficient generating means 7c, thereby obtaining the second color data R2, G2, B2, C2, M2, Y2. According to the color data conversion apparatus of the fourth embodiment, the second color data R2, G2, B2, C2, M2, Y2 are obtained by the following equation (12), where (Fij) indicates the matrix of coefficients (i=1 to 6 and j=1 to 7).

$$\begin{bmatrix} R2 \\ G2 \\ B2 \\ C2 \\ M2 \\ Y2 \end{bmatrix} = (Fij) \begin{bmatrix} h1p2 \\ h1q2 \\ h22 \\ h1p3 \\ h1q3 \\ h23 \\ \alpha \end{bmatrix} \quad (12)$$

The color data conversion circuit of the fourth embodiment additionally generates inter-hue region data valid only in the regions between particular pairs of mutually adjacent primary hues, and performs a matrix operation including multiplication of the inter-hue region data values by matrix coefficients to obtain the second color data. The matrix coefficients by which the inter-hue region data values are multiplied are valid only in the regions where the corresponding inter-hue region data values are valid. Accordingly, color reproduction in an inter-hue region of interest can be adjusted independently of the other inter-hue regions by adjusting the relevant matrix coefficients.

In the above example, two items of inter-hue region data h22, h23 are generated, but the fourth embodiment may be modified so as to generate only one of these two items of inter-hue region data. The fourth embodiment may also be modified to generate inter-hue region data in a way other than by using the second and third hue region data. It is also possible, for example, to generate inter-hue region data (first inter-hue region data) from the first hue region data and then to generate second and third inter-hue region data by multiplying the first inter-hue region data by the multiplier coefficients k2 and k3.

Fifth Embodiment

Figure 33:
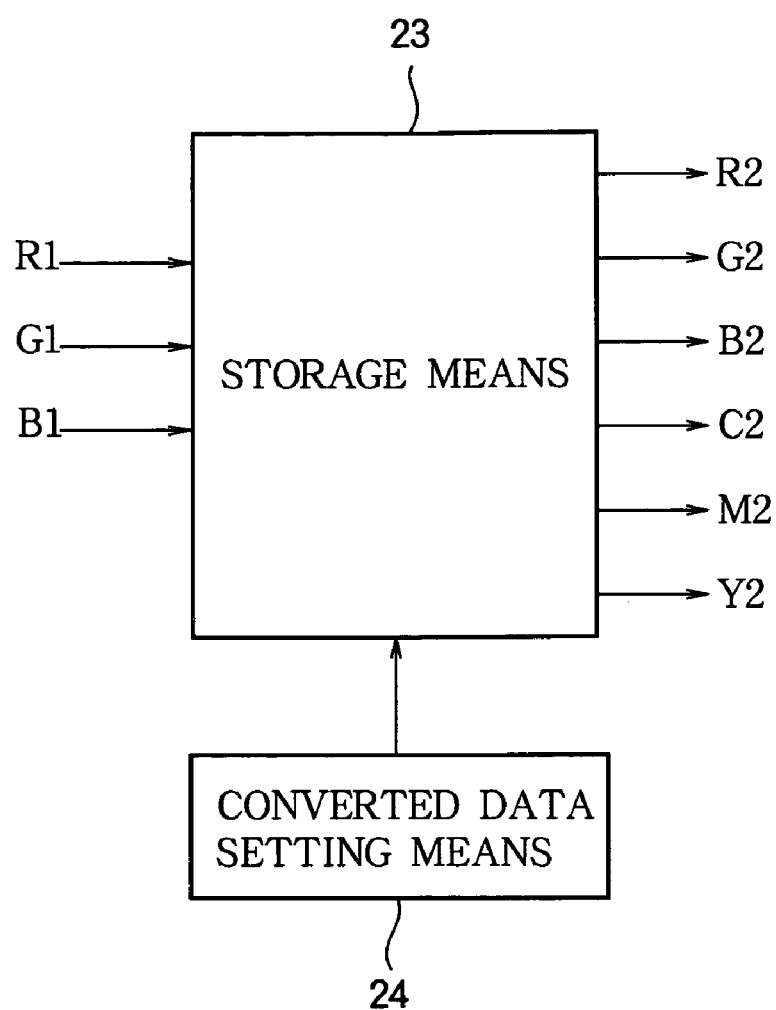
FIG. 33 is a block diagram illustrating a color data conversion apparatus according to a fifth embodiment of the invention.

Referring to FIG. 33, the color data conversion apparatus in the fifth embodiment comprises a storage means 23 and a converted data setting means 24. The converted data setting means 24 is, for example, a computing device such as a microcomputer that calculates second color data, shown as data for six primary colors R2, G2, B2, C2, M2, Y2, by the calculation process described in any one of the preceding embodiments for each combination of values of first color data R1, G1, B1. All of the calculated second color data are stored into the storage means 23, using the first color data as an address. The storage means 23 receives the first color data as a read address, and outputs the second color data stored at the received address, thereby performing color data conversion. This embodiment is flexible in that the matrix coefficients used in the calculations can be adjusted as the need arises.

The converted data setting means 24 may also be configured so as to read appropriate data among data prestored in a separately provided external storage means (not shown) and load the data into the storage means 23, instead of calculating the data. In this case the data prestored in the external storage means have been calculated as described in one of the preceding embodiments, and the converted data setting means 24 selects one of a plurality of sets of data. This enables the color conversion process to be carried out in one of a plurality of selectable ways.

Alternatively, if the color conversion process is always carried out in the same way, fixed data obtained by the process described in one of the preceding embodiments may be stored permanently in the storage means 23, and the storage means 23 may perform the color data conversion process by itself, without requiring a converted data setting means 24.

The fifth embodiment can accordingly be practiced entirely in hardware. The first to fourth embodiments can be practiced in hardware, software, or a combination of hardware and software.

Those skilled in the art will recognize that further variations are possible within the scope of the invention, which is defined in the appended claims.

What is claimed is:

1. A color conversion apparatus for converting first image data to second image data, the first and second image data both describing an image with a plurality of picture elements (pixels), the first image data having first color data with three values per pixel, the three values expressing, respectively, red, green, and blue components of the pixel, the second image data having second color data with at least four values per pixel, the color conversion apparatus comprising:
   means for calculating characteristic information of the first color data;
   means for calculating, from the first color data, a plurality of first hue region data values valid in respective hue regions surrounding certain predetermined hues;
   means for using the characteristic information to adjust magnitudes of the plurality of the first hue region data values to obtain, for at least some of the hue regions, second to N-th hue region data values, wherein N is an integer equal to or greater than three;
   coefficient generating means for generating prescribed matrix coefficients for the second to N-th hue region data values; and
   matrix operation means for calculating the second color data by performing a matrix operation including multiplication of the second to N-th hue region data values by the matrix coefficients.

2. The color conversion apparatus. of claim 1, wherein the second to N-th hue region data values obtained for each hue region add up to a sum equal to the first hue region data value for the hue region.

3. The color conversion apparatus of claim 1, further comprising means for using at least one of the second to N-th hue region data values to obtain at least one inter-hue region data value valid for a region between two adjacent hues among said certain predetermined hues, wherein:
   the coefficient generating means also generates matrix coefficients for the second to N-th inter-hue region data; and
   the matrix operation performed by the matrix operation means also includes multiplication of the second to N-th inter-hue region data values by the matrix coefficients generated therefor.

4. The color conversion apparatus of claim 1, wherein N is equal to three.

5. The color conversion apparatus of claim 1, wherein the means for using the characteristic information to adjust magnitudes of the plurality of the first hue region data values comprises:
   means for using the characteristic information to obtain second to N-th multiplier coefficients; and
   means for multiplying each first hue region data value by the second to N-th multiplier coefficients to obtain the second to N-th hue region data.

6. The color conversion apparatus of claim 5, wherein the second to N-th multiplier coefficients add up to a sum of unity.

7. The color conversion apparatus of claim 5, wherein each of the second to N-th multiplier coefficients has a separate value for each of said hue regions.

8. The color conversion apparatus of claim 1, wherein the characteristic information includes brightness information for the first color data.

9. The color conversion apparatus of claim 1, wherein the characteristic information includes saturation information for the first color data.

10. The color conversion apparatus of claim 1, wherein the means for calculating characteristic information calculates the characteristic information from brightness information and saturation information for the first color data.

11. The color conversion apparatus of claim 1, wherein said plurality of hues includes six hues, the six hues being red, green, blue, cyan, magenta, and yellow.

12. A color data conversion method for converting first image data to second image data, the first and second image data both describing an image with a plurality of pixels, the first image data having first color data with three values per pixel, the three values expressing, respectively, red, green, and blue components of the pixel, the second image data having second color data with at least four values per pixel, the color data conversion method comprising:
   calculating characteristic information of the first color data;
   calculating, from the first color data, a plurality of first hue region data values valid in respective hue regions surrounding certain predetermined hues;
   using the characteristic information to adjust magnitudes of the plurality of the first hue region data values to obtain, for at least some of the hue regions, second to N-th hue region data values, wherein N is an integer equal to or greater than three;

generating prescribed matrix coefficients for the second to N-th hue region data values; and calculating the second color data by performing a matrix operation including multiplication of the second to N-th hue region data values by the matrix coefficients.

13. A color data conversion apparatus having a storage means storing a relation between first color data and second color data calculated by the data conversion method of claim 12, the first color data having three values per pixel, the second color data having at least four values per pixel, and using the storage means as a lookup table to convert first image data to second image data, the first and second image data both describing an image with a plurality of pixels, the first image data using the first color data to describe each pixel in an image, the second image data using the second color data to describe each said pixel in the image.

* * * * *